(12) United States Patent
Ishibashi

(10) Patent No.: US 7,965,104 B2
(45) Date of Patent: Jun. 21, 2011

(54) DATA TRANSMISSION SYSTEM AND METHOD, AND ELECTRONIC APPARATUS PROVIDED WITH SAME DATA TRANSMISSION SYSTEM

(75) Inventor: Osamu Ishibashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/665,763

(22) PCT Filed: Jun. 20, 2008

(86) PCT No.: PCT/JP2008/061298
§ 371 (c)(1),
(2), (4) Date: Dec. 21, 2009

(87) PCT Pub. No.: WO2009/001760
PCT Pub. Date: Dec. 31, 2008

(65) Prior Publication Data
US 2010/0188175 A1    Jul. 29, 2010

(30) Foreign Application Priority Data

Jun. 22, 2007  (JP) ................................. 2007-165089

(51) Int. Cl.
*H03K 19/0175* (2006.01)
(52) U.S. Cl. ................. 326/82; 326/30; 326/86; 326/87
(58) Field of Classification Search ............ 326/30, 326/82–83, 86–87; 327/108–112; 333/22 R
See application file for complete search history.

(56) References Cited

U.S. PATENT DOCUMENTS

| 5,444,740 A * | 8/1995 | Mizukami et al. ............ 375/286 |
| 2003/0133513 A1 * | 7/2003 | Fujimoto ...................... 375/257 |

FOREIGN PATENT DOCUMENTS

| JP | 9-8851 A | 1/1997 |
| JP | 2001053598 A | 2/2001 |
| JP | 2006014268 A | 1/2006 |

OTHER PUBLICATIONS

International Search Report for PCT/JP2008/061298 mailed Jul. 15, 2008.

* cited by examiner

*Primary Examiner* — Rexford N Barnie
*Assistant Examiner* — Jany Tran

(57) ABSTRACT

A data transmission system includes a transmitter including a drive unit outputting complementary signals to first and second transmission lines according to data for transmission, and a receptor including first and second termination resistors, and a receiver circuit. One ends of the first and second termination resistors are respectively connected to first and second nodes that are connected to first and second transmission lines and other ends of the first and second termination resistors are connected in common to a third node. The receiver circuit supplies a current to the third node and outputs received data corresponding to data for transmission, in accordance with a potential difference between the first and second nodes.

13 Claims, 21 Drawing Sheets

DATA TRANSMISSION SYSTEM AND METHOD, AND ELECTRONIC APPARATUS PROVIDED WITH SAME DATA TRANSMISSION SYSTEM

REFERENCE TO RELATED APPLICATION

This application is the National Phase of PCT/JP2008/061298, filed Jun. 20, 2008, which is based upon and claims the benefit of the priority of Japanese Patent Application No. 2007-165089 (filed on Jun. 22, 2007), the disclosure of which is incorporated herein in its entirety by reference thereto.

TECHNICAL FIELD

The present invention relates to data transmission technology, and in particular to a system that transmits data via a transmission line and an electronic apparatus provided with this data transmission system.

BACKGROUND ART

In a display device transmission system mounted on a mobile apparatus, with the increase of a transmission speed accompanying the increase in the number of grayscales and higher resolution of the display device, and with increasing complexity in the structure of the mobile apparatus, it is desired to reduce the number of wires in FPCs (Flexible Printed Circuits) passing through a hinge part of the mobile apparatus. Therefore, in recent years, a high speed serial transmission system has been in widespread use in the display device transmission system mounted on a mobile apparatus.

The display device transmission system, since mounted on a mobile apparatus, is required to be of low power consumption and to cope with various types of transmission lines having different characteristic impedances and resistance values, such as PWBs (Printed Wired Boards), FPCs, glass substrates, and so forth.

An example of a transmission system solving this type of problem, will be described below, with reference to the description of Patent Document 1.

FIG. 18 is a diagram (which is extracted from FIG. 6 of Patent Document 1) showing a configuration of a receiver circuit described in the abovementioned Patent Document 1, and FIG. 19 is a diagram (which is extracted from FIG. 1 of Patent Document 1) showing a configuration of a transmitter circuit described in the abovementioned Patent Document 1.

As shown in FIG. 19, a transmitter circuit 200, as described in the above-mentioned Patent Document 1, includes inverters 201 and 202, and first to third N-channel MOS transistors 203, 204, and 205.

The third N-channel MOS transistor 205 is turned ON, when signal transmission is performed and is turned OFF, when signal transmission is not performed. In this way, the amplitude voltage of a complementary signal output is reduced to decrease a delay time of a signal which is transmitted from the transmitter circuit 200 to the receiver circuit 100.

In the transmitter circuit 200, the first N-channel MOS transistor 203 and the second N-channel MOS transistor 204 are complementarily turned ON and OFF, based on a signal level of transmission data/DIN supplied to an input terminal 206. When the transmission data/DIN is LOW, the first N-channel MOS transistor 203 is turned ON, a first output terminal 208 has a ground potential, the second N-channel MOS transistor 204 is turned OFF, and a second output terminal 209 is in a high impedance state (referred to below as "floating potential"). When the transmission data/DIN is HIGH, the second N-channel MOS transistor 204 is turned ON, the second output terminal 209 has a ground potential, the first N-channel MOS transistor 203 is turned OFF, and the second output terminal 209 is in a high impedance state ("floating potential").

A first input terminal 104 and a second input terminal 105 of the receiver circuit 100 in FIG. 18 are respectively connected to the first output terminal 208 and the second output terminal 209 of the transmitter circuit 200 of FIG. 19, via two transmission lines.

As shown in FIG. 18, the receiver circuit 100 includes an N-channel MOS transistor 101, an N-channel MOS transistor 102, a first receiver 110, a second receiver 120, a flip-flop circuit 130, and an inverter 103.

The first receiver 110 converts the difference between currents flowing through a first N-channel MOS transistor 113 and a second N-channel MOS transistor 114 to a voltage, and the second receiver 120 converts the difference between currents flowing through a third N-channel MOS transistor 123 and a fourth N-channel MOS transistor 124.

The flip-flop circuit 130 is an RS flip-flop formed of NANDs 131 and 132, each of which has an output cross-connected to an input of the other, and holds an output signal of the first receiver 110 and the second receiver 120. With regard to output of the flip-flop circuit 130, a value that is held is delivered from an output terminal 107 via the inverter 103.

Currents respectively flowing through the first N-channel MOS transistor 113 and the third N-channel MOS transistor 123 depend on a potential difference between a bias terminal 106 and the first input terminal 104, and currents respectively flowing through the second N-channel MOS transistor 114 and the fourth N-channel MOS transistor 124 depend on a potential difference between the bias terminal 106 and the second input terminal 105.

The potential of the first input terminal 104 depends on a resistance value of the N-channel MOS transistor 203, a resistance value of a transmission line, and a resistance value of the N-channel MOS transistor 101 of the receiver circuit 100, when the N-channel MOS transistor 203 of the transmitter circuit 200 is turned ON, and depends on a resistance value of the N-channel MOS transistor 101 of the receiver circuit 100, when the N-channel MOS transistor 203 of the transmitter circuit 200 is turned OFF.

In the same way, the potential of the second input terminal 105 depends on a combined resistance of an ON resistance value of the N-channel MOS transistor 204, a resistance value of a transmission line, and a resistance value of the N-channel MOS transistor 102 of the receiver circuit 100, when the N-channel MOS transistor 204 of the transmitter circuit 200 is turned ON, and depends on a resistance value of the N-channel MOS transistor 102 of the receiver circuit 100, when the N-channel MOS transistor 204 of the transmitter circuit 200 is turned OFF.

Therefore, since the current flowing from the receiver circuit 100 varies according to ON resistance value of the N-channel MOS transistors 203 and 204 in the transmitter circuit 200 and the resistance value of the transmission line, the differential current amplitude received by the receiver circuit 100 and power consumption of the receiver circuit 100 also vary.

As a method of solving the above problems, Patent Document 2 describes a transmission system. FIG. 20 is a diagram (extracted from FIG. 7 and the like, of Patent Document 2) showing a configuration of a receiver described in the above-mentioned Patent Document 2, and FIG. 21 is a diagram (extracted from FIG. 3 of Patent Document 2) showing a configuration of a transmitter circuit described in the abovementioned Patent Document 2.

As shown in FIG. 20, the receiver apparatus described in the abovementioned Patent Document 2 includes a termination resistor 312 and a receiver circuit 330.

The receiver circuit 330 includes constant current sources 332 and 333 for supplying a constant current I0 to nodes 314 and 315 respectively, and a data detection circuit 334 for discriminating data transmitted, based on a voltage (that is, potential difference between the node 314 and the node 315) applied to the termination resistor 312.

The data detection circuit 334 is configured so as to supply currents I1 and I2 that are small to the extent of being negligible as comparison to the constant current I0, to the nodes 314 and 315, respectively.

In the transmission system described in the abovementioned Patent Document 2, with the constant current sources 332 and 333 provided in the receiver circuit 330, even if an ON resistance value of transistors 503 and 504 in a transmitter circuit 500 in FIG. 21 and a resistance value of a transmission line vary, a current flowing from the receiver circuit 330 is invariably kept constant, and power consumption of the receiver circuit 330 is invariably kept constant. Furthermore, with constant current sources 332 and 333 provided in the receiver circuit 330 and the termination resistor 312, the differential voltage amplitude between input terminals 308 and 309 is invariably kept constant.

[Patent Document 1]
JP Patent Kokai Publication No. JP-P2001-53598A
[Patent Document 2]
JP Patent Kokai Publication No. JP-P2006-14268A

SUMMARY

A following analysis of the related art is given by the present invention.

With regard to the transmission system disclosed in Patent Document 2, however, there are several problems (Following is the investigation result by the present inventor)

A first problem is that faster operation is difficult.

A reason for this problem lies in the fact that a rise time of a transmission voltage signal is longer than a fall time. When data transmission is performed, in order to reduce influences of reflection and externally caused noise, output resistance of a transmitter circuit and termination resistance of a receiver circuit are matched with a characteristic impedance of a transmission line.

In order to perform impedance matching, with an output impedance of the transmitter circuit having a value the same as the characteristic impedance of the transmission line, bridge termination resistance of the receiver circuit has a value the same as differential mode impedance of the transmission line.

With regard to a transmission line formed of a printed circuit board wiring, the differential mode impedance has a value of about double the characteristic impedance.

Therefore, in the abovementioned Patent Document 2, as a condition of impedance matching, a value of a termination resistor 312 of the receiver circuit 330 in FIG. 20 is double an ON resistance value of transistors 503 and 504 of a transmitter circuit 500 in FIG. 21.

On the other hand, the rise time and fall time of the voltage signal generated in the termination resistor 312 in FIG. 20 and transmitted via the transmission line, depend on output resistance of a current output circuit (constant current sources 332 and 333) and load capacitance of the transmission line and the like.

In the abovementioned Patent Document 2, the fall time of a transmission voltage signal depends on resistance values of the transistors 503 and 504 of the transmitter circuit 500 in FIG. 21, load capacitance of the transmission line and the like, and the rise time of the transmission voltage signal depends on the termination resistor 312 of the receiver circuit 330 in FIG. 20, load capacitance of the transmission line, and the like.

Accordingly, in the abovementioned Patent Document 2, the rise time of a transmission voltage signal becomes longer than the fall time.

A second problem is that power consumption is large.

A reason for this problem is that, in the abovementioned Patent Document 2, when input terminals 308 and 309 in FIG. 20 have a ground potential, currents flowing from constant current sources 332 and 333 flow directly to the transmission line without passing through the termination resistor 312, and half the current flowing from the receiver circuit 330 does not contribute to a voltage signal developed across the termination resistor 312.

Accordingly, it is an object of the present invention to provide a data transmission system and method, and an electronic apparatus, in which it is possible to transmit data at a higher speed.

Another object of the present invention is to provide a data transmission system and method, and an electronic apparatus, in which it is possible to reduce power consumption.

According to one aspect of the present invention, there is provided a data transmission system that includes: a transmission line including a first transmission line and a second transmission line; a transmitter connected to one end of the transmission line; and a receiver connected to another end of the transmission line.

In the present invention, the transmitter comprises: a first connection unit connected to one end of the first transmission line; and a second connection unit connected to one end of the second transmission line. The first connection unit is controlled to be turned ON and OFF in accordance with data for transmission. The first connection unit, when turned ON, electrically connects the first transmission line to a ground terminal. The second connection unit is controlled to be turned ON and OFF complementarily with the first connection unit in accordance with the data for transmission. The second connection unit, when turned ON, electrically connects the second transmission line to a ground terminal.

In the present invention, the receiver comprises: a first termination resistor having one end connected to a first node that is connected to another end of the first transmission line; a second termination resistor having one end connected to a second node that is connected to another end of the second transmission line, the first and second termination resistors having another ends connected in common to a third node; and a receiver circuit that comprises: a current supply unit that supplies a current to the third node; and a data detection unit that outputs received data corresponding to the data for transmission, in accordance with a potential difference between the first node and the second node.

In the present invention, a resistance value of the first termination resistor and a resistance value of the second termination resistor may match half a differential mode impedance of the transmission line.

In the present invention, the first connection unit may include a first MOS transistor having a drain connected to one end of the first transmission line, and a source connected to the ground terminal. An ON resistance of the first MOS transistor may match a characteristic impedance of the transmission line.

In the present invention, the second connection unit may include a second MOS transistor having a drain connected to the second transmission line, and a source connected to the ground terminal. An ON resistance of the second MOS transistor may match a characteristic impedance of the transmission line; and complementary value signals are supplied respectively to a gate of the second MOS transistor and a gate of the first MOS transistor based on the data for transmission.

In the present invention, the first connection unit, when turned ON, electrically connects the first transmission line to a power supply terminal instead of the ground terminal, and the second connection unit, when turned ON, electrically connects the second transmission line to a power supply terminal instead of the ground terminal. In the present invention, the current supply unit may supply a sink current to the third node. In the present invention, the first connection unit may include a first MOS transistor having a drain connected to one end of the first transmission line, and a source connected to the power supply terminal, and an ON resistance of the first MOS transistor may match a characteristic impedance of the transmission line. In the present invention, the second connection unit may include a second MOS transistor having a drain connected to one end of the second transmission line, and a source connected to the power supply terminal; an ON resistance of the second MOS transistor matches a characteristic impedance of the transmission line; and complementary value signals are supplied respectively to a gate of the second MOS transistor and a gate of the first MOS transistor based on the data for transmission.

In the present invention, the current supply unit may have a configuration provided with a constant current source for supplying a constant current to the third node.

In the present invention, there may be provided with a first input protection resistor connected between the first node and the data detection unit, a second input protection resistor connected between the second node and the data detection unit, and a third input protection resistor connected between the third node and the current supply unit. In the present invention, a resistance value of the first input protection resistor and a resistance value of the second termination resistor may match double a common mode impedance of the transmission line.

In the present invention, there may be provided with a first input protection resistor connected between the first node and the data detection unit, a second input protection resistor connected between the second node and the data detection unit, a third input protection resistor connected between the third node and the current supply unit, and a capacitor connected between the current supply unit and a ground terminal. In the present invention, a resistance value of the third input protection resistor may match the difference between the common mode impedance of the transmission line and ¼ of the differential mode impedance of the transmission line.

In the present invention, the data detection unit may have a configuration including a differential current data detection circuit for generating the received data in response to a current difference between current flowing at the first node and current flowing at the second node. In the present invention, the differential current data detection circuit may have a configuration provided with a first detection circuit for generating a first detection signal in response to a current difference between a current flowing at the first node and a current flowing at the second node, a second detection circuit for generating a second detection signal in response to a current difference between a current flowing at the first node and a current flowing at the second node, and a flip-flop circuit for holding the first detection signal and the second detection signal and generating the received data.

In the present invention, the data detection unit may have a configuration provided with a first constant voltage circuit connected to the first input protection resistor, and a second constant voltage circuit connected to the second input protection resistor, and including a differential current data detection circuit for generating the received data in response to a current difference between current flowing at the first node and current flowing at the second node.

In the present invention, the data detection unit may include a differential voltage data detection circuit including differential pair transistors having an input pair connected to other ends of the first and second input protection resistors, the other ends of the first and second input protection resistors being opposite respectively to one ends of the first and second input protection resistor, the one ends of the first and second input protection resistor being connected respectively to the first node and the second node. The differential voltage data detection circuit generates the received data in response to a current difference between current flowing at the first node and current flowing at the second node.

According to the present invention, there is provided a receiver including first and second termination resistors having one ends respectively connected to first and second transmission lines through which transmission data from a transmitter is transmitted in a differential mode, and having other ends commonly connected; a current source supplying a current to the commonly connected other ends of the first and second termination resistors; and a data detection circuit detecting received data based on a potential difference between one end of the first and one end of the second termination resistors. According to this receiver, with regard to a current path of the current source, termination resistor and transmission line, in case the transmitter sets one transmission line, which is activated in response to a value of the transmission data, out of the first and second transmission lines, to a ground potential to make a current flow and sets another transmission line to be in a floating state, a current from the current source flows to the one transmission line and a ground line on the transmitter side, via the termination resistor corresponding to the activated one transmission line, out of the first and second termination resistors, whereas, in case the transmitter sets one transmission line, which is activated in response to a value of the transmission data, out of the first and second transmission lines, to a power supply potential to make a current flow and sets another transmission line to be in a floating state, a current from a power supply of the transmitter flows into the current source, via the activated one transmission line and the termination resistor corresponding to the one transmission line out of the first and second termination resistors.

According to the present invention, there is provided a receiver connected to the first and second transmission lines, having transmission data from the transmitter transmitted by a differential, the receiver being provided with first and second termination resistors each having one end respectively connected to the first and second transmission lines, having other ends commonly connected, and a current from a current source is supplied to the commonly connected other ends; and there is provided a data detection circuit for detecting data based on a potential difference between one end of the first termination resistor and one end of the second termination resistor.

According to another aspect of the present invention, there is provided a data transmission method including a step of transmitting transmission data from a transmission side to first and second transmission lines in a differential mode, and a step of supplying, on a reception side, current from a current source to a common connection node of first and second termination resistors, each of which has one end respectively connected to the first and second transmission lines, the other ends being commonly connected, and detecting data based on a potential difference between one end of each of the first and second termination resistors.

According to the present invention, it is possible to transmit data at a faster speed. A reason for this is that, in the present invention it is made possible for an output impedance of a first connection unit and an output impedance of a second connection unit of a transmitter, and a first termination resistor and a second termination resistor of a receiver to have approximately the same value, and a rise time and a fall time of each of a voltage signal developed across the first termination resistor and a voltage signal developed across the second termination resistor can be made approximately the same.

According to the present invention, it is possible to reduce power consumption. A reason for this is that the present invention has a configuration such that all current flowing from a current supply unit of a receiver always flows via one of either of a first termination resistor or a second termination resistor, and a current from the current supply unit that is connected to a common connection node of the first termination resistor and the second termination resistor contributes to voltage signals generated respectively across terminals of the first termination resistor and across terminals of the second termination resistor.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

Figure 1:
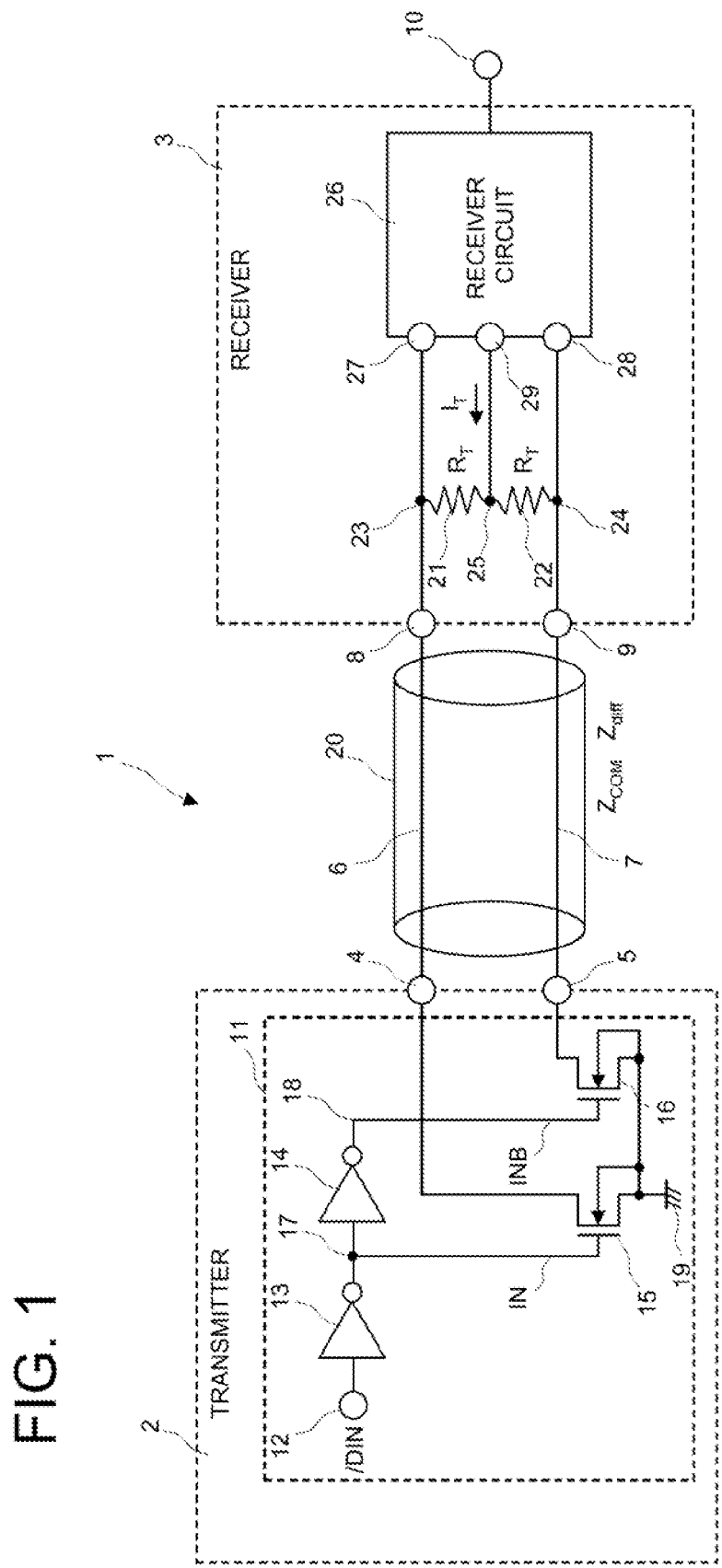
FIG. 1 is a diagram showing an overall configuration of a first exemplary embodiment of a transmission system according to the present invention.

A more detailed description of the above described present invention is given with reference to the drawings. In a data transmission system according to one mode of the present invention, as shown in FIG. 1, one end of a first transmission line (6) and one end of a second transmission line (7) are respectively connected to a first connection unit (output transistor 15) and a second connection unit (output transistor 16) provided in a transmitter circuit (2), and another end of each thereof is connected to a receiver (3). The receiver (3) includes: a first termination resistor (21) having one end connected to a first node (23) that is connected to the other end of the transmission line (6); a second termination resistor (22) having one end connected to a second node (24) that is connected to the other end of the second transmission line (7), and having the other end connected to the other end of the first termination resistor (21) at a third node (25); and a receiver circuit (26). The receiver circuit (26) includes a current supply unit (for example, 32 in FIG. 7) that supplies a current ($I_T$) to the third node (25), and a data detection unit (for example, 33 in FIG. 7) that produces received data corresponding to data for transmission according to a potential difference between the first node (23) and the second node (24).

A current flowing from the receiver (3) to the first transmission line (6) or to the second transmission line (7) flows from a current supply unit (for example, 32 in FIG. 7) and the third node (25), to the first transmission line (6), via the first termination resistor (21) and the first node (23), or flows from the current supply unit (for example, 32 in FIG. 7) and the third node (25), to the second transmission line (7), via the second termination resistor (22) and the second node (24).

A current flowing from the transmitter (2) to the first transmission line (6) or the second transmission line (7) flows via the first connection unit (15) or the second connection unit (16). When one of the first and second connection unit (15 and 16) of the transmitter circuit (2) is turned ON, depending on whether a corresponding transmission line out of the first an second transmission line (6 and 7) is set to a GND potential or to a power supply potential VDD, a source current or a sink current from the current supply unit of the receiver circuit (26) is supplied to the third node (25).

In order to have impedance matching, an output impedance of the first connection unit (15) of the transmitter (2) and an output impedance of the second connection unit (16) are made equal to a characteristic impedance of the transmission line, and an impedance of combined resistance of the first termination resistor (21) and the second termination resistor (22) connected between the first node (23) and the second node (24) of the receiver (3) is made equal to a differential mode impedance of the transmission line.

Normally, the characteristic impedance of a transmission line is approximately twice the common impedance.

Therefore, in one mode of the present invention, it is made possible for an output impedance of the first connection resistor (15) of the receiver (2) and an output impedance of the second connection unit (16) to have approximately the same value as the first termination resistor (21) and the second termination resistor (22) of the receiver (3), respectively. As a result, according to the present invention, it is made possible for a rise time and a fall time of each of voltage signals which are developed respectively across the first termination resistor (21) and across the second termination resistor (22) to be approximately the same.

With regard to entire current flowing from the current supply unit (for example, 32 in FIG. 7) of the receiver (3), since a current always flows to the transmitter (2) via one of either the first termination resistor (21) or the second termination resistor (22), all the current flowing from the current supply unit (for example, 32 in FIG. 7) contributes to the voltage signals developed across terminals of the first termination resistor (21) and across terminals of the second termination resistor (22).

FIG. 1 is a diagram showing an overall configuration of an exemplary embodiment of the transmission system according to the present invention. Referring to FIG. 1, in the present exemplary embodiment, the transmission system 1 includes a transmission line 20 including a first transmission line 6 and a second transmission line 7 through which differential current signals are transmitted. The transmitter 2 is connected to one end of the transmission line 20, and the receiver 3 is connected to the other end of the transmission line 20.

The transmitter 2 includes a transmitter circuit 11, a first output terminal 4, and a second output terminal 5.

The transmitter circuit 11 is a transmitter circuit that generates an output signal corresponding to data for transmission. The output signal generated by the transmitter circuit 11 is output from the first output terminal 4 or the second output terminal 5, and supplied to the receiver 3 via the first transmission line 6 or the second transmission line 7. In more detail, the transmitter circuit 11 includes a data input terminal 12, a first inverter 13, a second inverter 14, a first output transistor 15, and a second output transistor 16.

The data input terminal 12 is a terminal for receiving a transmission data signal /DIN corresponding to data for transmission. With regard to signal name /DIN, a symbol "/" indicates that the signal is active at LOW.

The first inverter 13 is a circuit that responsive to an input signal, generates an inverted version of the input signal. The first inverter 13 inverts and outputs a transmission data signal/ DIN supplied from the data input terminal 12.

The second inverter 14, similar to the first inverter 13, is a circuit that responsive to an input signal, generates an inverted version of the input signal. A signal IN output from the first inverter 13 is supplied to the second inverter 14 via a node 17. The second inverter 14 inverts the signal and outputs a signal INB.

The first output transistor 15 and the second output transistor 16 are N-channel MOS transistors having sources connected to a ground line GND. The first output transistor 15 functions as a switch element that electrically connects the first output terminal 4 to the ground line GND in response to the signal IN, and the second output transistor 16 functions as a switch element that electrically connects the second output terminal 5 to the ground line GND in response to the signal INB.

A gate of the first output transistor 15 is connected to the node 17 and the signal IN output from the first inverter 13 is applied to a gate of the first output transistor 15.

A gate of the second output transistor 16 is connected to an output of the second inverter 14. The signal INB output from the second inverter 14 is applied to the gate of the second output transistor 16 via a node 18.

The first output transistor 15, responsive to the signal IN output from the first inverter 13, is turned ON to make a current supplied from the first output terminal 4 flow to the ground line GND.

In the same way, the second output transistor 16, responsive to the signal IN output from the second inverter 14, is turned ON to make a current supplied from the second output terminal 5 flow to the ground line GND.

The receiver 3 includes a first termination resistor 21, a second termination resistor 22, the receiver circuit 26, a first input terminal 8, and a second input terminal 9.

The first termination resistor 21 is a resistance component connected between the first node 23 connected to the first input terminal 8 and the third node 25. The second termination resistor 22 is a resistance component connected between the second node 24 connected to the second input terminal 9 and the third node 25. The first termination resistor 21 has a resistance value $R_T$ so as to be able to supply a desired amplitude voltage, according to a current flowing between the first node 23 and the third node 25. The second termination resistor 22 has a resistance value $R_T$ so as to be able to supply a desired amplitude voltage, according to a current flowing between the second node 24 and the third node 25.

The receiver circuit 26 is a receiving circuit that generates received data. The receiver circuit 26 has two functions.

A first function is to supply to a current $I_T$ used in data transmission and reception to the third node 25.

A second function is to discriminate data transmitted by the transmitter 2 from a voltage (that is, a potential difference between the first node 23 and the second node 24) developed across the first termination resistor 21 and the second termination resistor 22.

Figure 2:
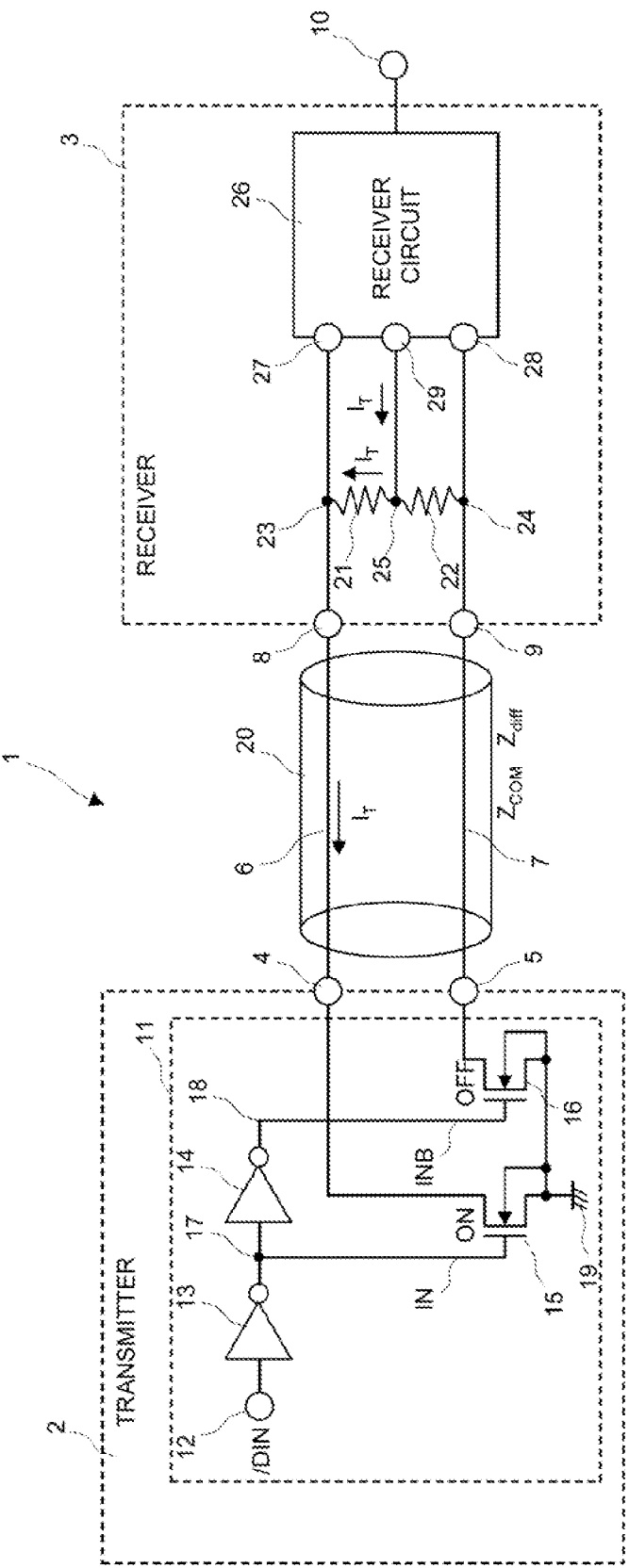
FIG. 2 is a diagram describing operation of the first exemplary embodiment of the transmission system according to the present invention.
Figure 3:
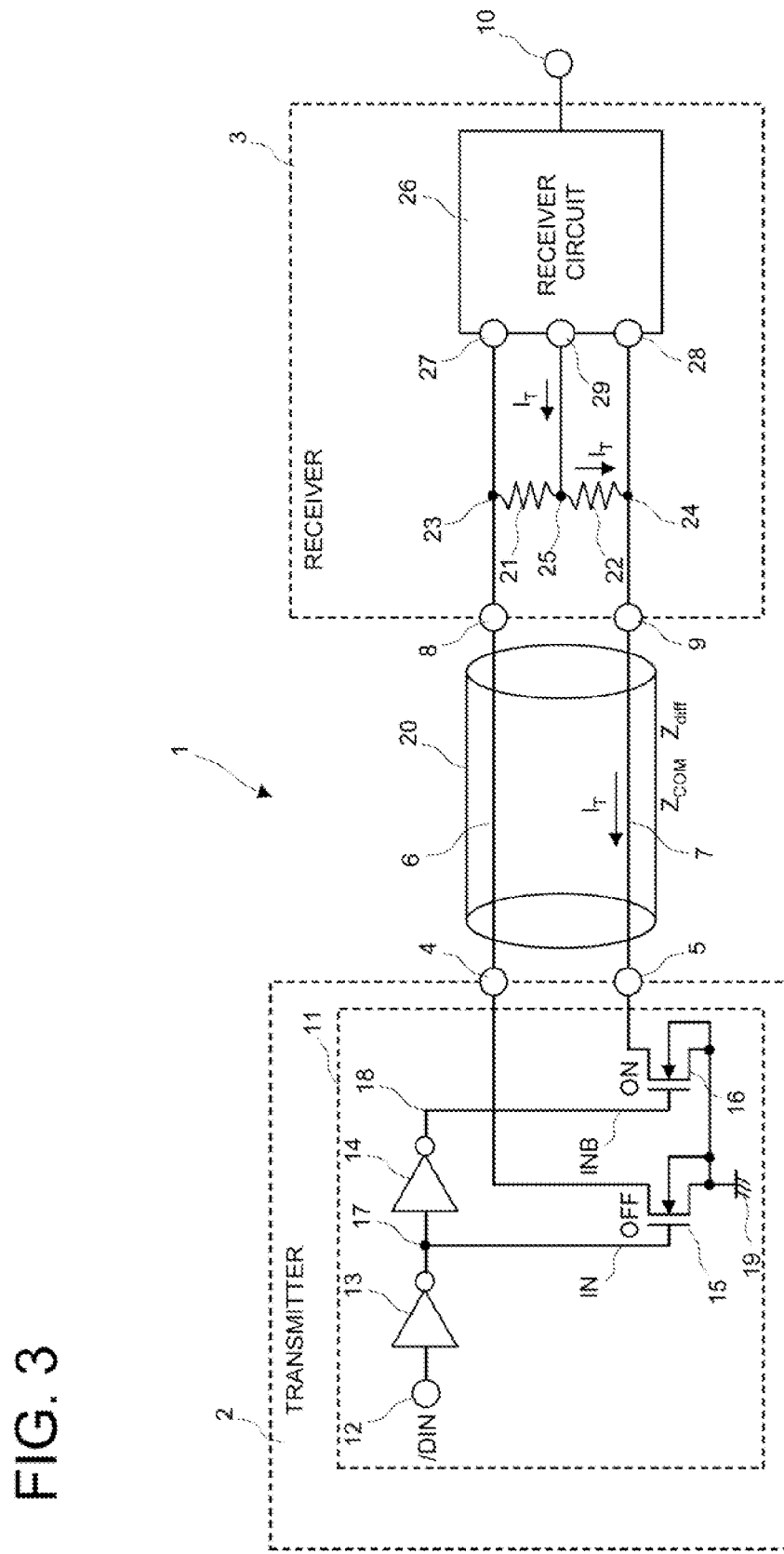
FIG. 3 is a diagram describing operation of the first exemplary embodiment of the transmission system according to the present invention.
Figure 4:
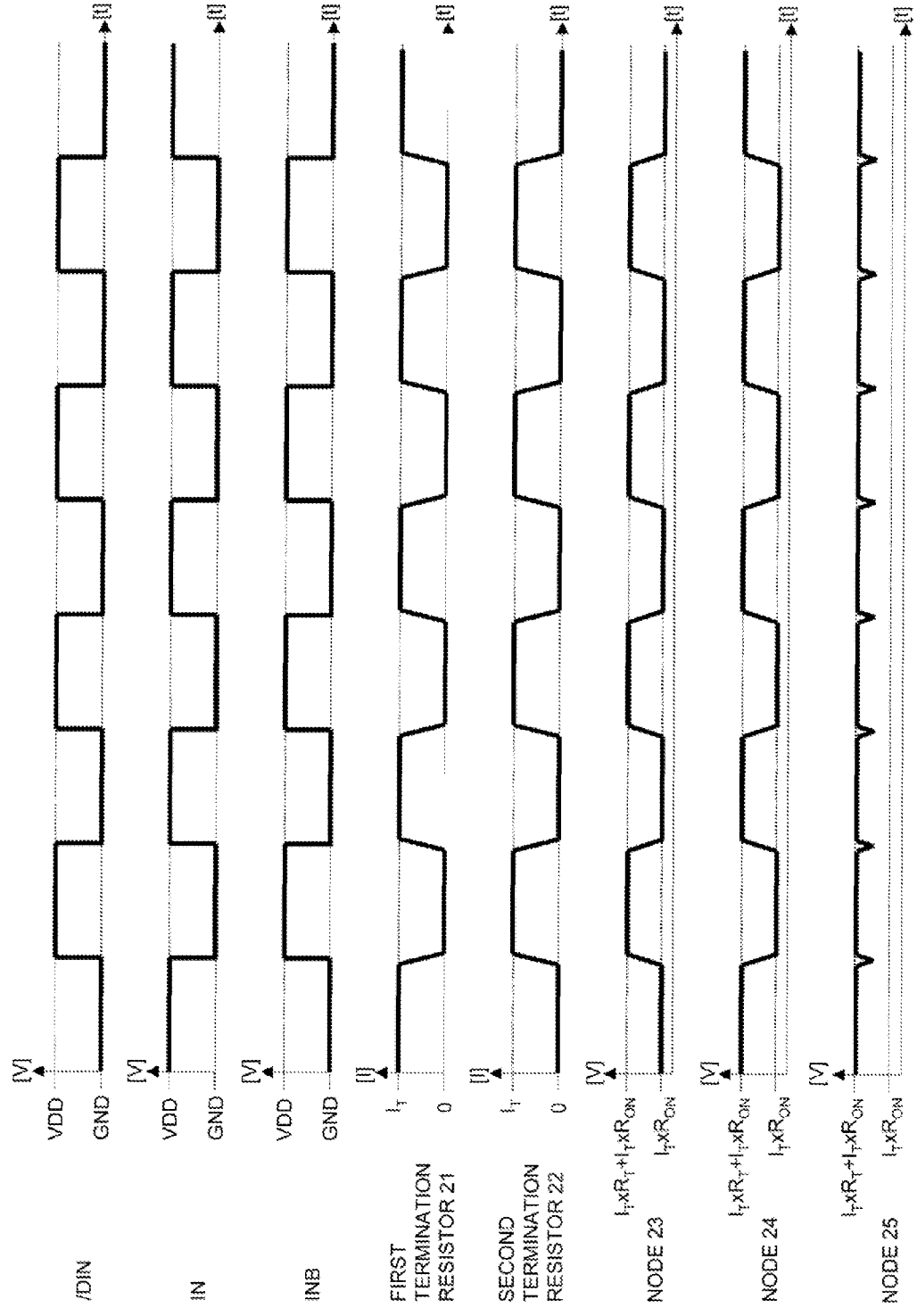
FIG. 4 is an operation chart describing operation of the first exemplary embodiment of the transmission system according to the present invention.

FIG. 2 and FIG. 3 are diagrams in which the circuit operation in the present exemplary embodiment is shown in FIG. 1. FIG. 4 is an operation chart (timing waveform chart) for describing operation of a circuit of the present exemplary embodiment shown in FIG. 1. FIG. 4 shows voltage waveforms of the data input terminal 12 (MIN) of FIG. 1, the output node 17 (IN) of the inverter 13, and the output node 18 (INB) of the inverter 14, current waveforms of current flowing through the termination resistors 21 and 22, and voltage waveforms of the nodes 23, 24, and 25. With reference to FIG. 2 to FIG. 4, the operation of the transmission system of the present exemplary embodiment will now be described.

A path of the current $I_T$ supplied to the third node 25 is determined according to either out of the first output transistor 15 and the second output transistor 16 in the transmitter circuit 11 being turned ON.

As shown in FIG. 2, when the first output transistor 15 of the transmitter circuit 11 is turned ON and the second output transistor 16 is turned OFF (when a transmission data signal /DIN has a GND potential), the current $I_T$ supplied to the third node 25 flows to the first node 23 via the first termination resistor 21. The current $I_T$ flows to a ground line GND 19 of the transmitter circuit 11 via the first transmitter line 6 and the first output transistor 15. Assuming that the ON resistance of the first output transistor 15 is $R_{ON}$, the potential of the first node 23 is $I_T \times R_{ON}$, and the potential of the third node 25 is $I_T \times R_{ON} + I_T \times R_T$. Since the second output transistor 16 is turned OFF (the second transmission line 7 is in a floating state), the potential of the second node 24 has the same potential $I_T \times R_{ON} + I_T \times R_T$ as the third node 25. Therefore, the first node 23 has a potential lower by $I_T \times R_T$ than the second node 24. The receiver circuit 26 discriminates transmitted data from this potential difference, and outputs the discriminated data as received data.

On the other hand, as shown in FIG. 3, when the first output transistor 15 is turned OFF and the second output transistor 16 is turned ON (when in FIG. 4, a potential of a transmission data signal /DIN is of the power supply potential VDD), the current $I_T$ flows to the second node 24 via the second termination resistor 22. The current $I_T$ flows to the ground line GND 19 of the transmitter circuit 11 via the second transmitter line 7 and the second output transistor 16. Assuming that the ON resistance of the second output transistor 16 is $R_{ON}$, the potential of the second node 24 is $I_T \times R_{ON}$, and the potential of the third node 25 is $I_T \times R_{ON} + I_T \times R_T$. Since the first output transistor 15 is turned OFF (the first transmission line 6 is in a floating state), the potential of the first node 23 has the same potential $I_T \times R_{ON} + I_T \times R_T$ as the third node 25. Therefore, the second node 24 has a potential lower by $I_T \times R_T$ than the first node 23. The receiver circuit 26 discriminates transmitted data from this potential difference, and outputs the discriminated data as received data.

In the data transmission system 1 having this type of configuration, preferably, in order to suppress reflection of voltage waves and current waves, impedances of the transmission line formed of the first transmission line 6 and the second transmission line 7, and of combined resistance of the first termination resistor 21 and the second termination resistor 22, match.

More specifically, a resistance value $2R_T$ of the combined resistance of the first termination resistor 21 and the second termination resistor 22 is preferably the same as the differential mode impedance $Z_{diff}$ of the transmission line formed of the first transmission line 6 and the second transmission line 7. By matching the impedances, it is possible to suppress the reflection of the voltage wave and the current wave, and to suppress signal noise transmitted in the transmission line.

In order to further suppress effects due to the reflection of the voltage wave and the current wave, reflection is preferably suppressed not only on the receiver circuit 26 side, but also on the transmitter circuit 11 side. In order to do this, the impedance of the transmitter circuit 11 may be matched with the characteristic impedance of the transmission line formed of the first transmission line 6 and the second transmission line 7. An ON resistance $R_{ON}$ of the first output transistor 15 and the second output transistor 16 in the transmitter circuit 11 is the same as the characteristic impedance $Z_{COM}$ of the transmission line formed of the first transmission line 6 and the second transmission line 7. In this way, reflection on the transmitter circuit 11 side is suppressed, and in addition, a signal-noise transmitted in the transmission line is further suppressed.

Normally, the differential mode impedance of the transmission line is double the characteristic impedance. Accordingly, it is possible for the output impedance of the first output transistor 15 and the output impedance of the second output transistor 16 to have the same value as the resistance value $R_T$ of the first termination resistor 21 and the second termination resistor 22.

As a result, it is possible for rise time and fall time of the voltage generated in the first termination resistor 21 and the second termination resistor 22 (that is, the potential difference of the first node 23 and the second node 24) to be approximately equal, and it is possible to transmit data at a higher speed.

With regard to all of the current flowing from the receiver circuit 26, since a current flows to the first output transistor 15 or the second output transistor 16 in the transmitter circuit 11 consistently via one of either the first termination resistor 21 or the second termination resistor 22, all of the current flowing from the receiver circuit 26 contributes to voltage developed across the first termination resistor 21 and the second termination resistor 22 (that is, the potential difference of the first node 23 and the second node 24), and reduction of power consumption is possible.

Figure 5:
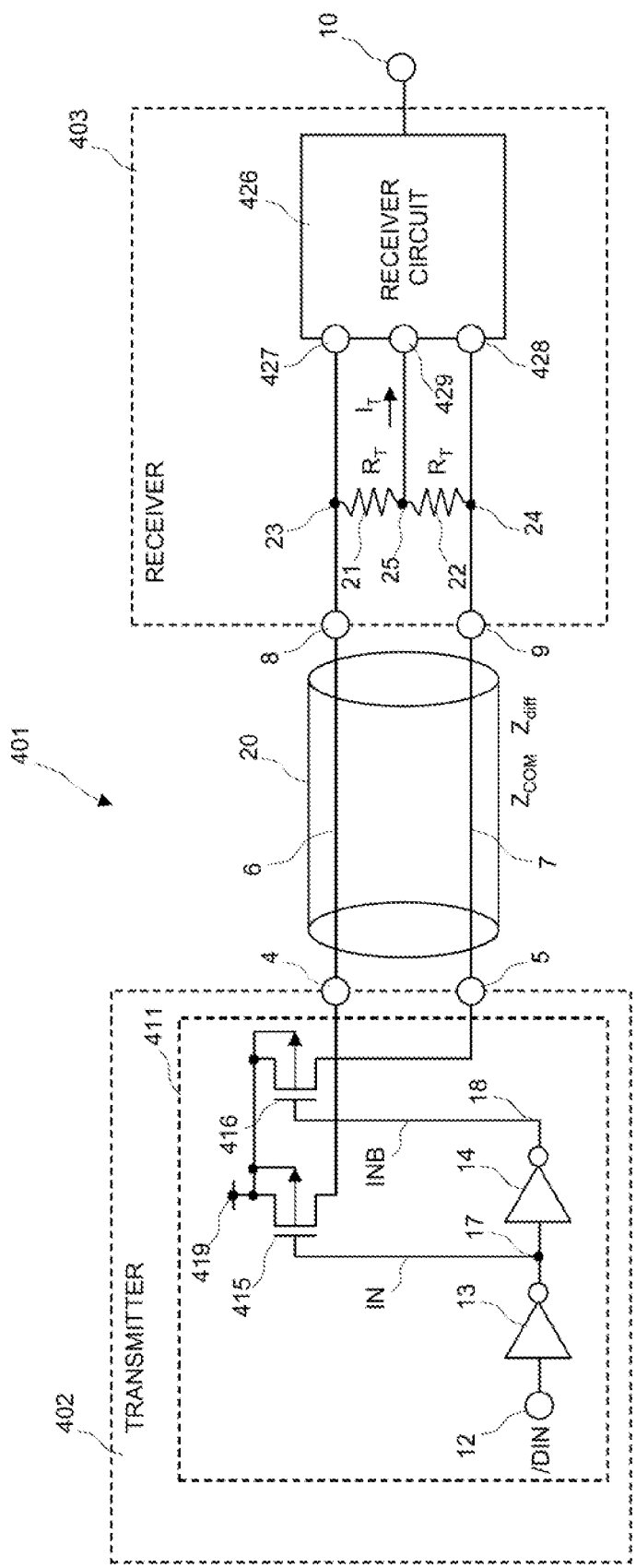
FIG. 5 is a block diagram showing an overall configuration of a second exemplary embodiment of the transmission system according to the present invention.

Next, a second exemplary embodiment of the present invention is described in detail with reference to the drawings. FIG. 5 is a block diagram showing an overall configuration of the second exemplary embodiment of the transmission system according to the present invention. In the abovementioned first exemplary embodiment, the first output transistor 15 and the second output transistor 16 forming the transmitter circuit 11 in the transmitter 2, are N-channel MOS transistors. In the present exemplary embodiment, P-channel MOS transistors 415 and 416 form the transmitter circuit 411. In the abovementioned first exemplary embodiment, the direction of current $I_T$, used in a data transmission signal supplied from a receiver circuit 26 in a receiver 3, flows in a direction from the receiver circuit 26 to the third node 25 (source current). In the present exemplary embodiment, the direction of the current $I_T$ used in a data transmission signal supplied from a receiver circuit 426 flows in a direction from the third node 25 to the receiver circuit 426. That is, in the present exemplary embodiment, the receiver circuit 426 supplies a sink current to the third node 25.

Figure 6:
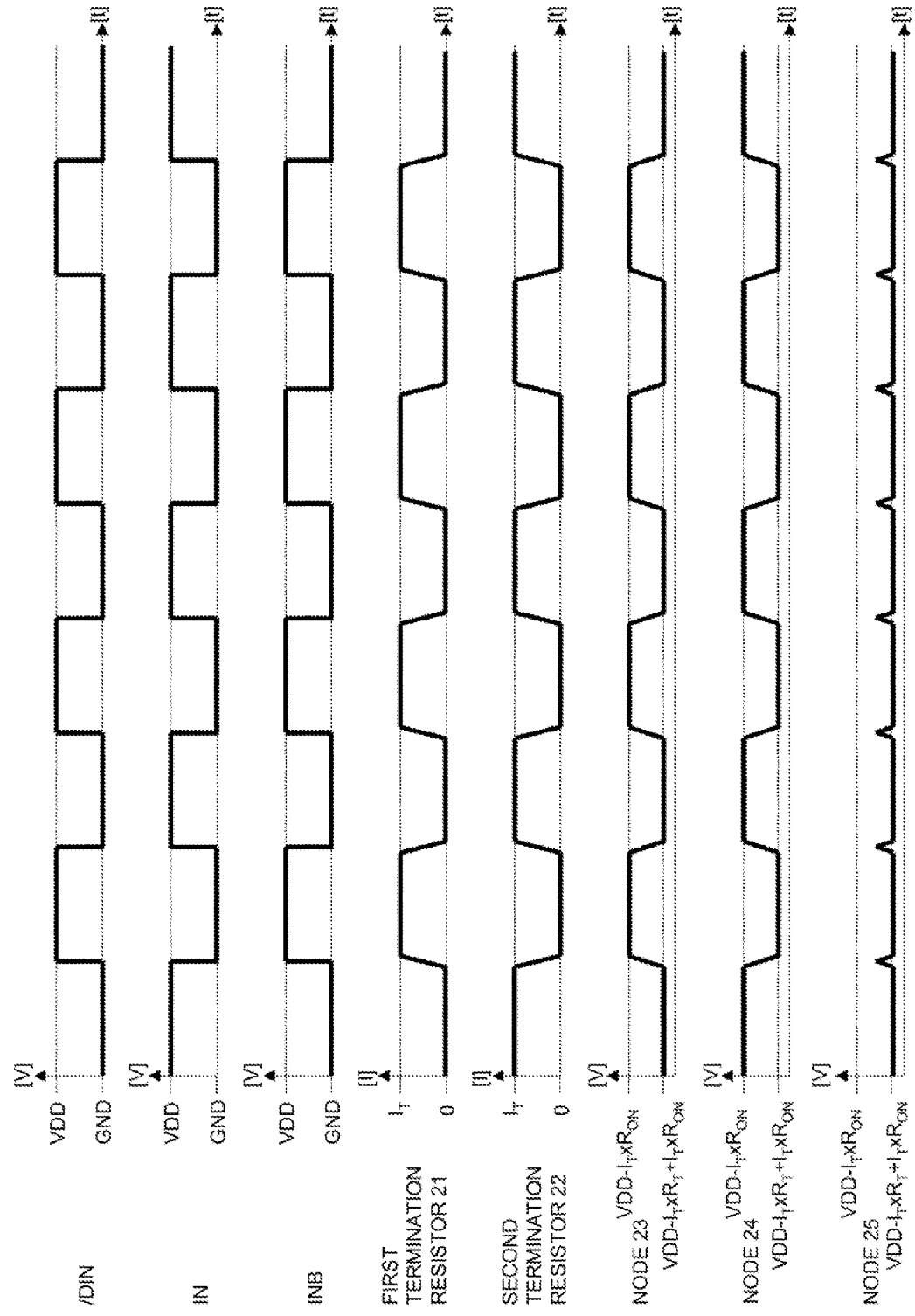
FIG. 6 is an operation chart describing operation of the second exemplary embodiment of the transmission system according to the present invention.

FIG. 6 is an operation chart (timing waveform chart) for describing operation of the second exemplary embodiment shown in FIG. 5. The operation of the second exemplary embodiment will now be described with reference to FIG. 5 and FIG. 6. As shown in FIG. 6, when a transmission data signal /DIN is GND, the first output transistor 415 is turned OFF, the second output transistor 416 is turned ON, and a current $I_T$ flows to the second node 24 from a power supply potential VDD 419, via the second output transistor 416 and a second transmission line 7. The current $I_T$ flows from the third node 25 to the receiver circuit 426, via the second termination resistor 22. Therefore, a potential at the second node 24 is higher by $I_T \times R_T$ than that at the first node 23. The receiver circuit 426 discriminates data transmitted from this potential difference, and outputs the discriminated data as received data.

On the other hand, when the potential of the transmission data signal /DIN is VDD, the first output transistor 415 is turned ON, the second output transistor 416 is turned OFF, and a current $I_T$ flows to the first node 23 from a power supply potential VDD 419, via the first output transistor 415 and a first transmission line 6. The current $I_T$ flows from the third node 25 to the receiver circuit 426, via the first termination resistor 21. Therefore, a potential at the first node 23 is higher by $I_T \times R_T$ than that at the second node 24. The receiver circuit 426 discriminates data transmitted from this potential difference, and outputs the discriminated data as received data.

Conditions for matching impedance, and operation of current flowing from the receiver circuit 426 to the termination resistors 21 and 22 are the same as the abovementioned first exemplary embodiment. The second exemplary embodiment of the present invention also has effects similar to the first exemplary embodiment.

Several specific examples of the receiver 3 of FIG. 1 will be described below.

FIRST EXAMPLE

Figure 7:
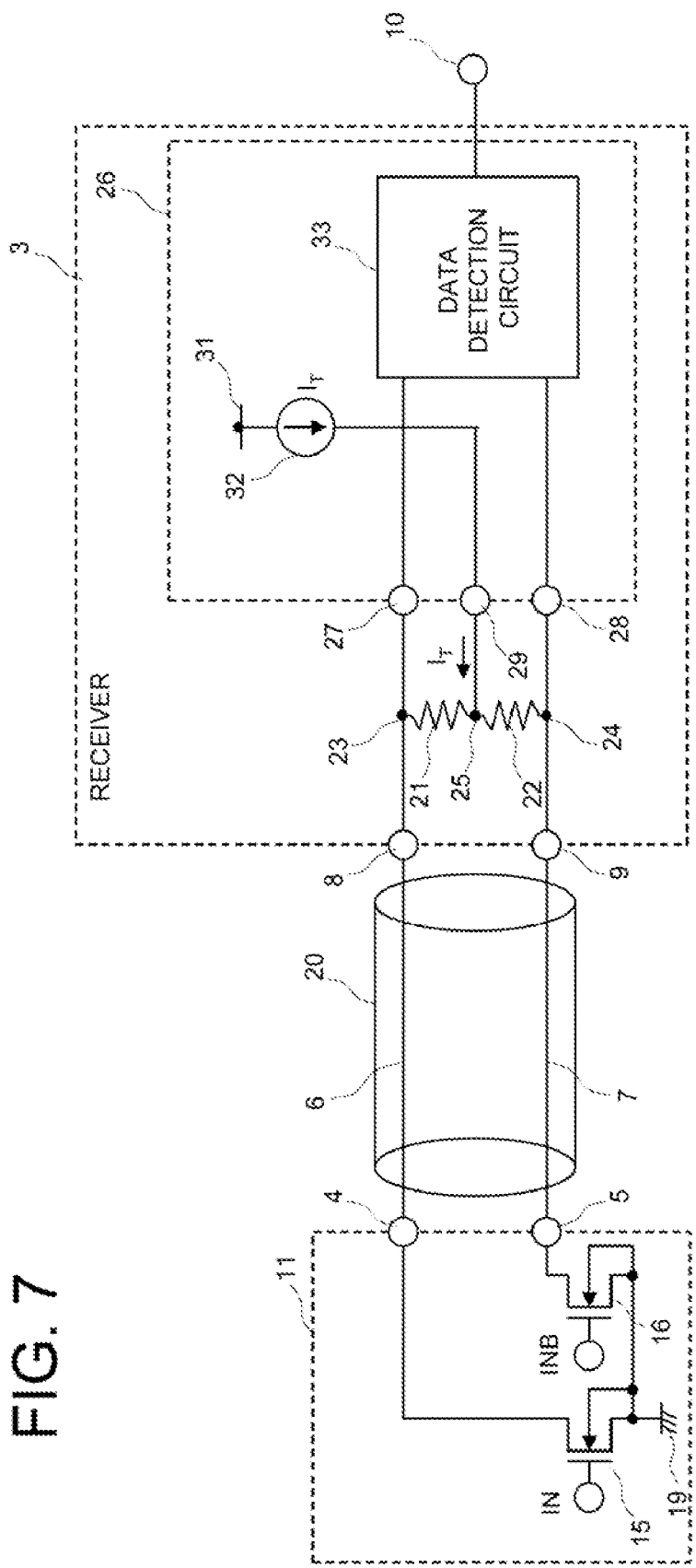
FIG. 7 is a block diagram showing a configuration of a first example of a receiver circuit of the present invention.

FIG. 7 is a block diagram showing one example of a configuration of a receiver circuit 26. In FIG. 7, 31 designates a power supply VDD, 32 designates a constant current source, 33 designates a data detection circuit, 27 designates a first input terminal, 28 designates a second input terminal, and 29 designates a current supply terminal.

A current $I_T$ generated by the constant current source 32 is supplied to a third node 25 from the current supply terminal 29. As described above, a potential difference is generated according to a transmission data signal pattern, between a first node 23 and a second node 24 connected to a first termination resistor 21 and a second termination resistor 22.

The data detection circuit 33 discriminates data transmitted from potential difference between the first input terminal 27 and the second input terminal 28, and outputs the discriminated data to an output terminal 10 as received data.

SECOND EXAMPLE

Figure 8:
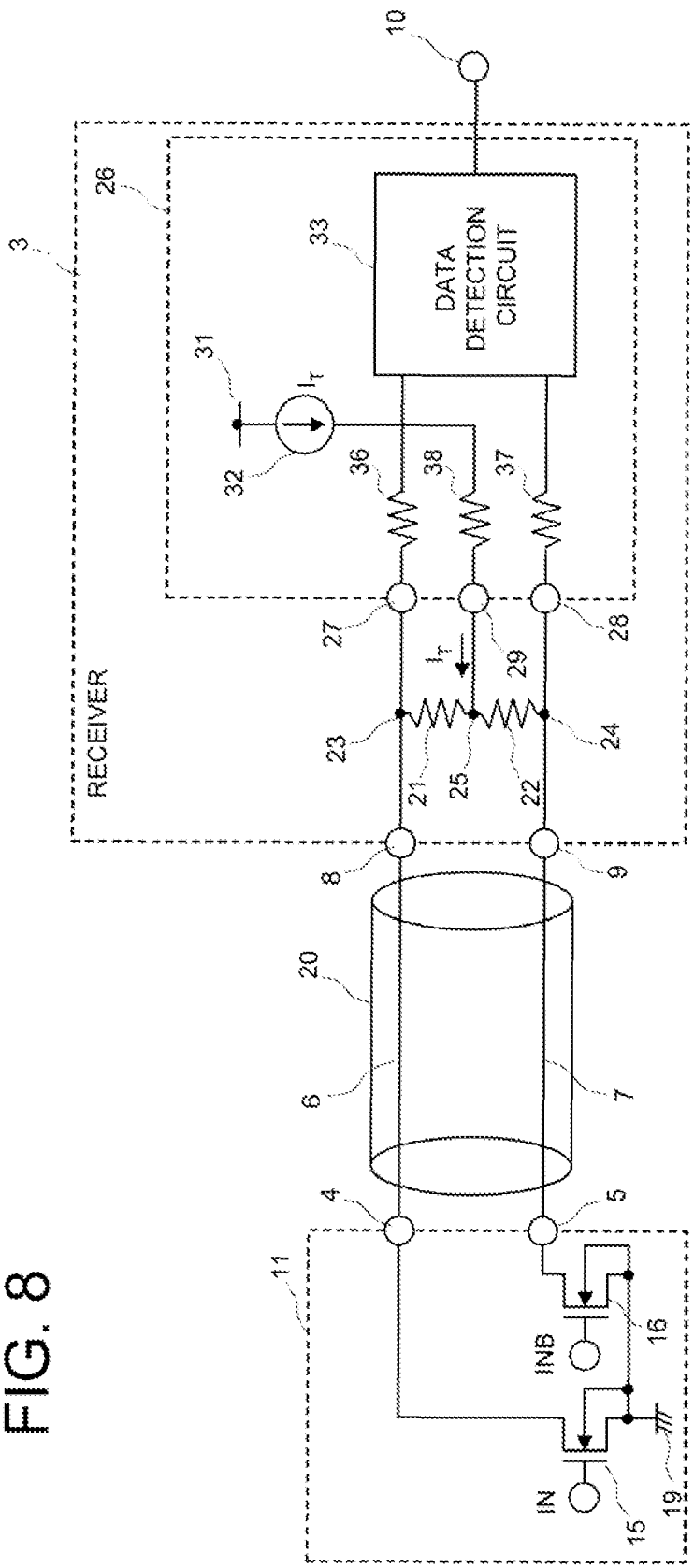
FIG. 8 is a diagram showing a configuration of a second example of the receiver circuit of the present invention.

FIG. 8 is a block diagram showing a configuration of a receiver circuit of a second example which implements a receiver circuit 26. In FIG. 8, 36 designates an input protection resistor connected between a first input terminal 27 and a data detection circuit 33, 37 designates an input protection resistor connected between a second input terminal 28 and the data detection circuit 33, and 38 designates an input protection resistor connected between a current supply terminal 29 and a constant current source 32. Other component elements are the same as in the abovementioned first example.

A current $I_T$ generated by the constant current source 32 is supplied to a third node 25 from the current supply terminal 29 via the input protection resistor 38. As described above, a potential difference is generated according to a transmission data signal pattern, between a first node 23 and a second node 24 connected to a first termination resistor 21 and a second termination resistor 22, and this potential difference is supplied to the data detection circuit 33 via the input protection resistor 36 and the input protection resistor 37 from the first input terminal 27 connected to the first node 23 and the second input terminal 28 connected to the second node 24. The data detection circuit 33 discriminates data transmitted from a potential difference between the first input terminal 27 and the second input terminal 28, and outputs the discriminated data to an output terminal 10 as received data. As a result, it is possible to protect the data detection circuit 33.

THIRD EXAMPLE

Figure 9:
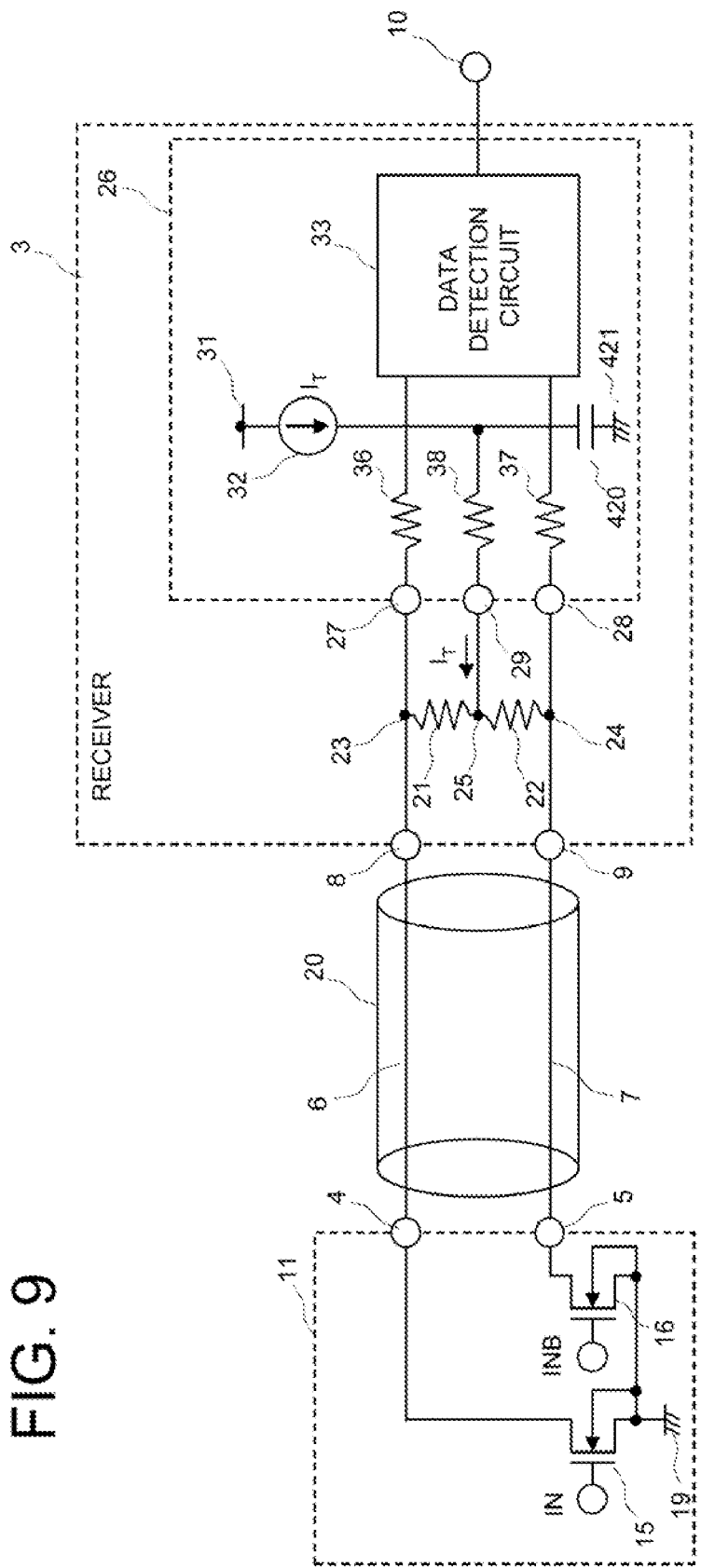
FIG. 9 is a diagram showing a configuration of a third example of the receiver circuit of the present invention.

FIG. 9 is a block diagram showing a further configuration of a receiver circuit 26. In FIG. 9, 420 designates a capacitor connected between a constant current source 32 and a ground line 421. Other component elements are the same as in the abovementioned second example.

A current $I_T$ generated by the constant current source 32 is supplied to a third node 25 from a current supply terminal 29 via an input protection resistor 38.

As described above, a potential difference is generated according to a transmission data signal pattern, between a first node 23 and a second node 24 connected to a first termination resistor 21 and a second termination resistor 22, and this potential difference is supplied to a data detection circuit 33 via an input protection resistor 36 and an input protection resistor 37 from a first input terminal 27 connected to the first node 23 and a second input terminal 28 connected to the second node 24.

The data detection circuit 33 discriminates data transmitted from potential difference between the first input terminal 27 and the second input terminal 28, and outputs the discriminated data to an output terminal 10 as received data.

The capacitor 420 has an impedance of approximately 0, in a high frequency band. Therefore, in the high frequency band, the input protection resistor 38 is grounded. As a result, it is possible to protect the data detection circuit 33. With the input protection resistor 38 having an appropriate resistance value, impedance matching is made possible for both a differential mode component and a common mode component.

FOURTH EXAMPLE

Figure 10:
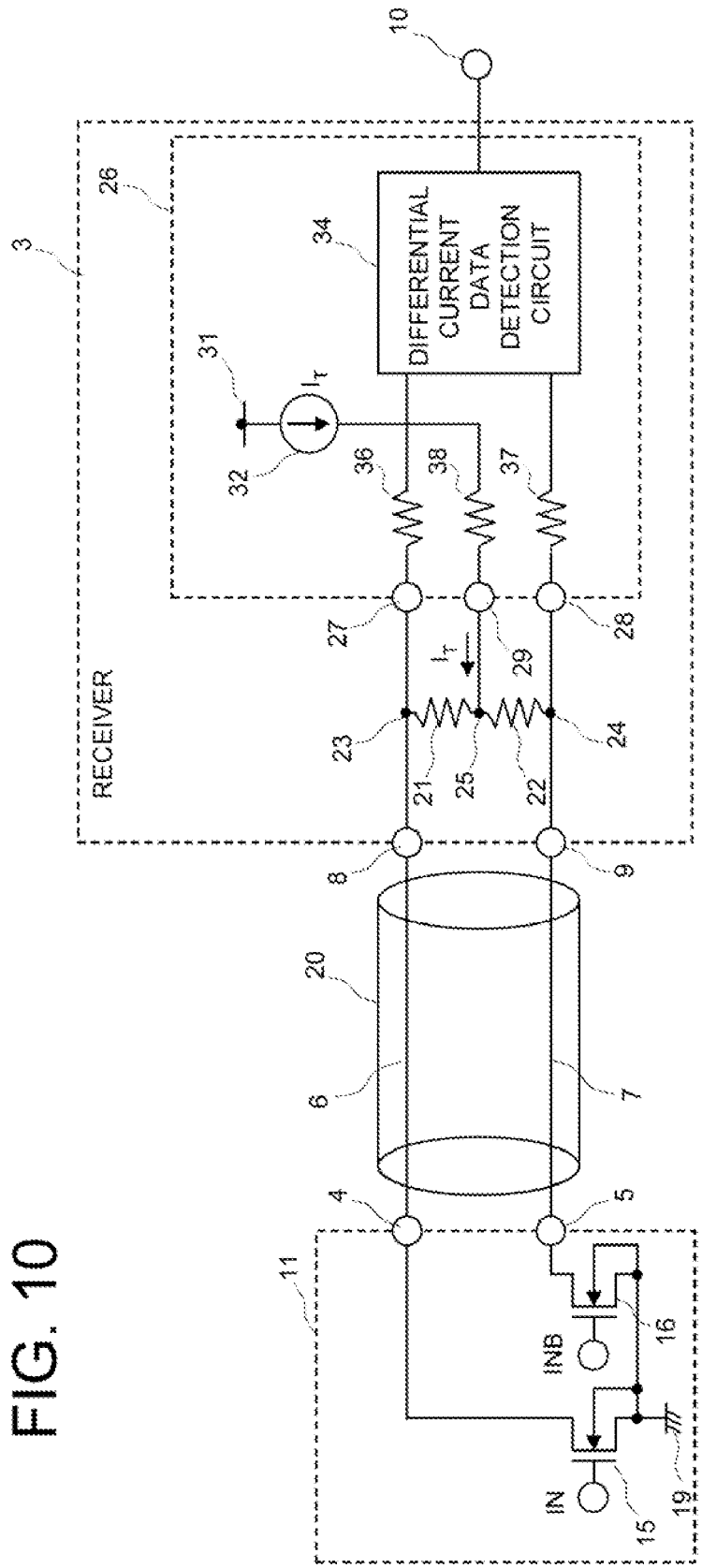
FIG. 10 is a diagram showing a configuration of a fourth example of the receiver circuit of the present invention.

FIG. 10 is a block diagram showing a further configuration of a receiver circuit 26. In FIG. 10, 34 designates a differential current data detection circuit 34 for detecting a current difference generated between a current flowing to a first input terminal 27 and a current flowing to a second input terminal 28. Other component elements are the same as in the abovementioned second example.

A current $I_T$ generated by a constant current source 32 is supplied to a third node 25 from a current supply terminal 29 via an input protection resistor 38. As described above, a potential difference is generated according to a transmission data signal pattern, between a first node 23 and a second node 24 connected to a first termination resistor 21 and a second termination resistor 22, and this potential difference is supplied to the differential current data detection circuit 34 via an input protection resistor 36 and an input protection resistor 37 from a first input terminal 27 connected to the first node 23 and a second input terminal 28 connected to the second node 24.

The differential current data detection circuit 34 discriminates data transmitted from a current difference generated between a current flowing to the first input terminal 27 via the input protection resistor 36 and a current flowing to the second input terminal 28 via the input protection resistor 37, and outputs the discriminated data to an output terminal 10 as received data. As a result, it is possible to protect the differential current data detection circuit 34.

With the input protection resistor 36 and the input protection resistor 37 having appropriate resistance values, impedance matching is made possible for both a differential mode component and a common mode component.

FIFTH EXAMPLE

Figure 11:
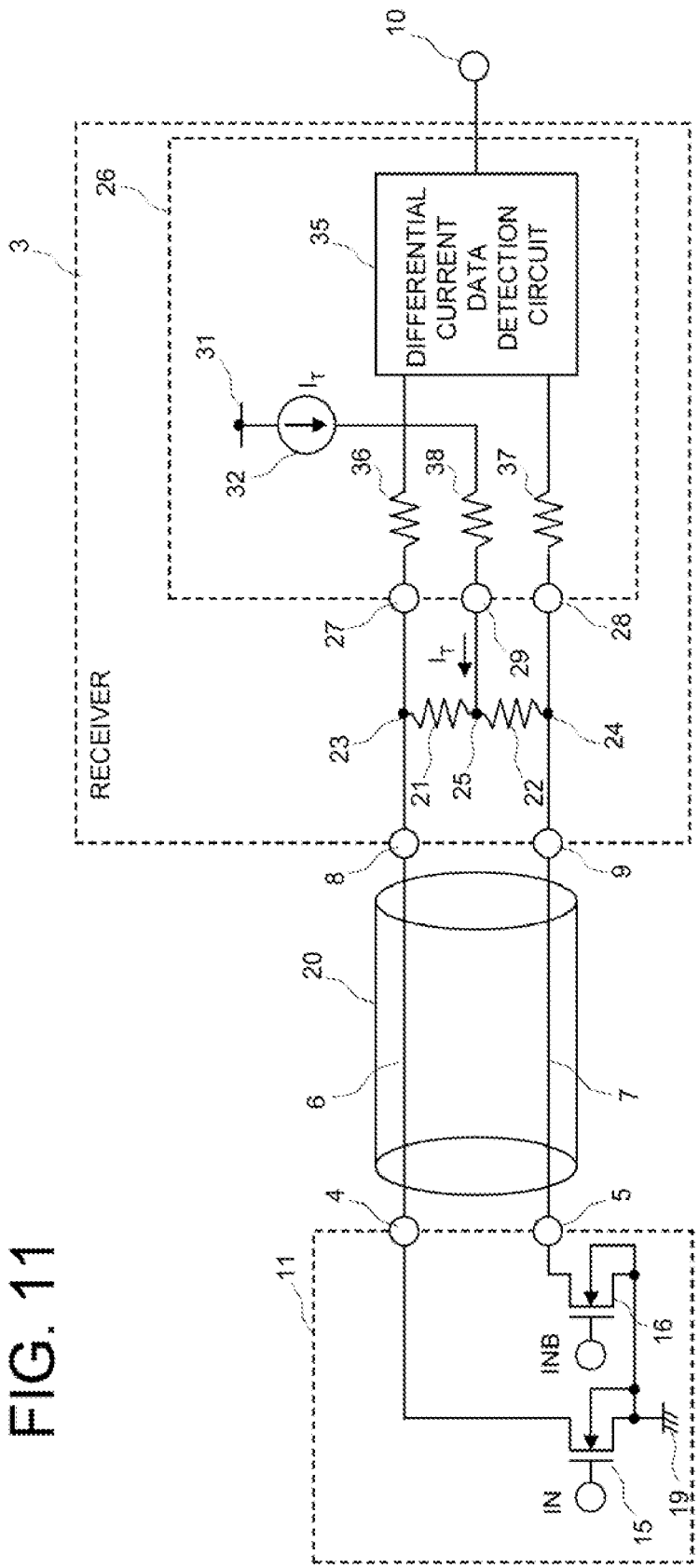
FIG. 11 is a diagram showing a configuration of a fifth example of the receiver circuit of the present invention.

FIG. 11 is a diagram showing a further configuration of a receiver circuit 26. In FIG. 11, 35 designates a differential voltage data detection circuit for detecting a potential difference generated between a first input terminal 27 and a second input terminal 28. Other component elements are the same as in the abovementioned second example and fourth example.

A current $I_T$ generated by a constant current source 32 is supplied to a third node 25 from a current supply terminal 29 via an input protection resistor 38. As described above, a potential difference is generated according to a transmission data signal pattern, between a first node 23 and a second node 24 connected to a first termination resistor 21 and a second termination resistor 22, and this potential difference is supplied to the differential voltage data detection circuit 35 via an input protection resistor 36 and an input protection resistor 37 from the first input terminal 27 connected to the first node 23 and the second input terminal 28 connected to the second node 24.

The differential voltage data detection circuit 35 discriminates data transmitted from a potential difference generated between the first input terminal 27 and the second input terminal 28, and outputs the discriminated data to an output terminal 10 as received data. As a result, it is possible to protect the differential voltage data detection circuit 35.

It is possible to generate a stable potential difference in the first termination resistor 21 and the second termination resistor 22.

SIXTH EXAMPLE

Figure 12:
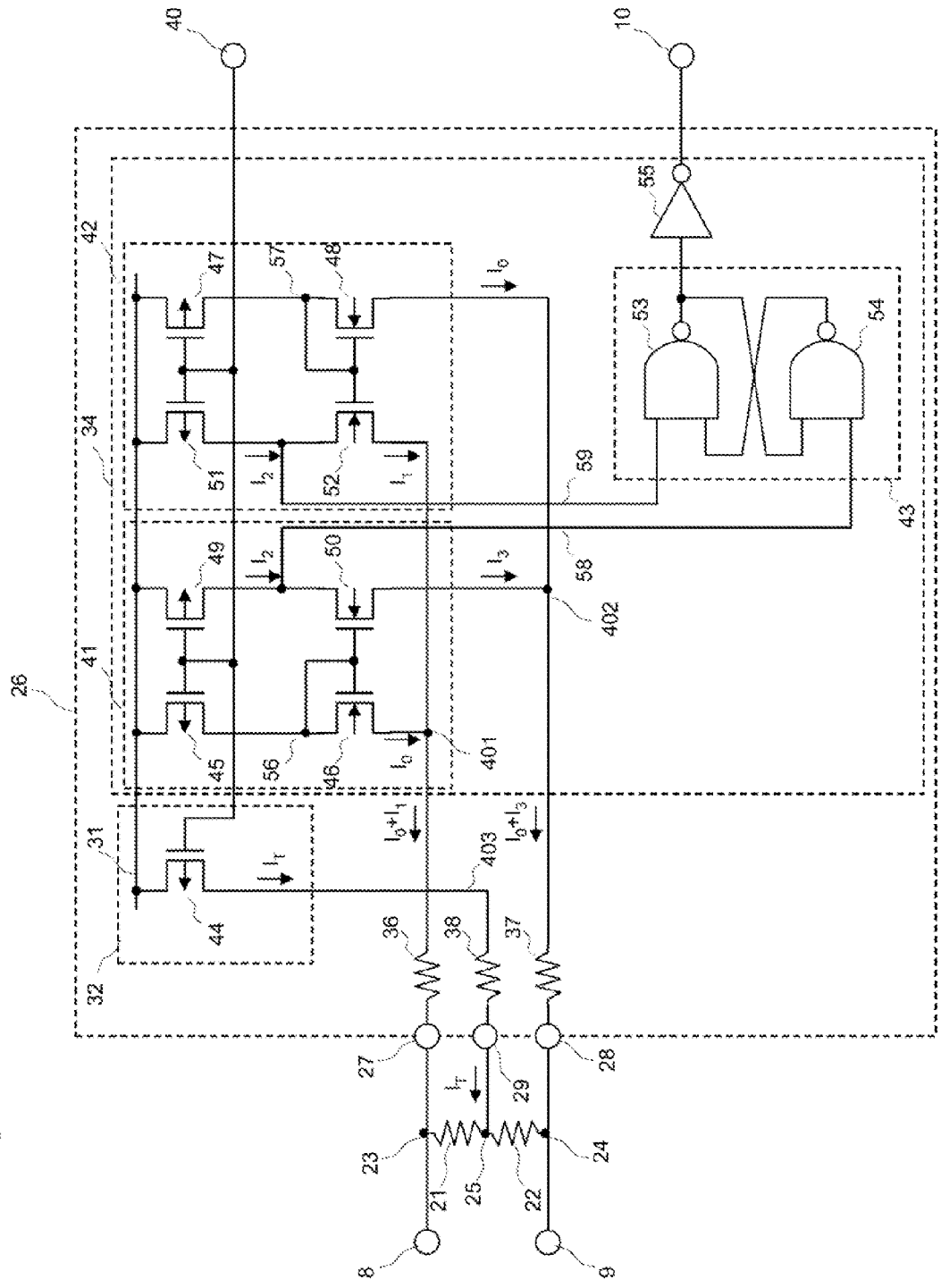
FIG. 12 is a diagram showing a configuration of a sixth example of the receiver circuit of the present invention.

FIG. 12 is a diagram showing one example of a circuit configuration of a receiver circuit 26. In FIG. 12, 40 designates a bias terminal, 41 designates a first differential current detection circuit, 42 designates a second differential current detection circuit, and 43 designates a flip-flop. An input protection resistor 36 is connected between a first input terminal 27 and a node 401.

An input protection resistor 37 is connected between a second input terminal 28 and a node 402. An input protection resistor 38 is connected between a current supply terminal 29 and a node 403.

A constant current source 32 is composed by a P-channel MOS transistor 44 which is connected between a power supply line 31 and a node 403 and has a gate connected to the bias terminal 40. The constant current source 32 supplies a constant current $I_T$ to a first termination resistor 21 and a second termination resistor 22 via the node 403 and the input protection resistor 38.

The first differential current detection circuit 41 includes a first P-channel MOS transistor 45, a second P-channel MOS transistor 49, a diode-connected first N-channel MOS transistor 46, and a second N-channel MOS transistor 50. A gate of the first P-channel MOS transistor 45 and a gate of the second P-channel MOS transistor 49 are connected in common to the bias terminal 40. The first P-channel MOS transistor 45 is connected between the power supply line 31 and a node 56. The first N-channel MOS transistor 46 is connected between the node 56 and a node 401, and supplies a constant current $I_0$ to the input protection resistor 36 via the node 401. The second P-channel MOS transistor 49 is connected between the power supply line 31 and a node 58, and supplies a constant current $I_2$ to the node 58.

Since the first. N-channel MOS transistor 46 is diode-connected, the potential of the node 56 is always higher, by a gate-to-source voltage $V_{GS}$ of the N-channel MOS transistor 46, than the potential of the node 401. The second N-channel MOS transistor 50 is connected between the node 58 and the node 402. The second N-channel MOS transistor 50 has a gate connected to a node 56 and provides a current $I_3$ according to a potential difference of the node 56 and the node 402 to vary the potential of the node 58.

The second differential current detection circuit 42 includes a first P-channel MOS transistor 47, a second P-channel MOS transistor 51, a diode-connected first N-channel MOS transistor 48, and a second N-channel MOS transistor 52. A gate of the first P-channel MOS transistor 47 and a gate of the second P-channel MOS transistor 51 are connected in common to the bias terminal 40. The first P-channel MOS transistor 47 is connected between the power supply line 31 and a node 57. The first N-channel MOS transistor 48 is connected between the node 57 and a node 402, and supplies a constant current $I_0$ to the input protection resistor 37 via the node 402. The second P-channel MOS transistor 51 which is connected between the power supply line 31 and a node 59, supplies a constant current $I_2$ to the node 59.

Since the first N-channel MOS transistor 48 is diode-connected, the potential of the node 57 is always higher, by a gate-to-source voltage $V_{GS}$ of the N-channel MOS transistor 48, than the potential of the node 402. The second N-channel MOS transistor 52m which is connected between the node 59 and the node 401 and has a gate connected to the node 57 supplies a current $I_1$ according to a potential difference of the node 57 and the node 401 to the node 401 to vary the potential of the node 59.

A flip-flop circuit 43, which is an RS latch including a NAND 53 and a NAND 54, holds a potential of the node 58 and a potential of the node 59, and outputs values thereof that are held, from an output terminal 10, via an inverter 55.

Figure 13:
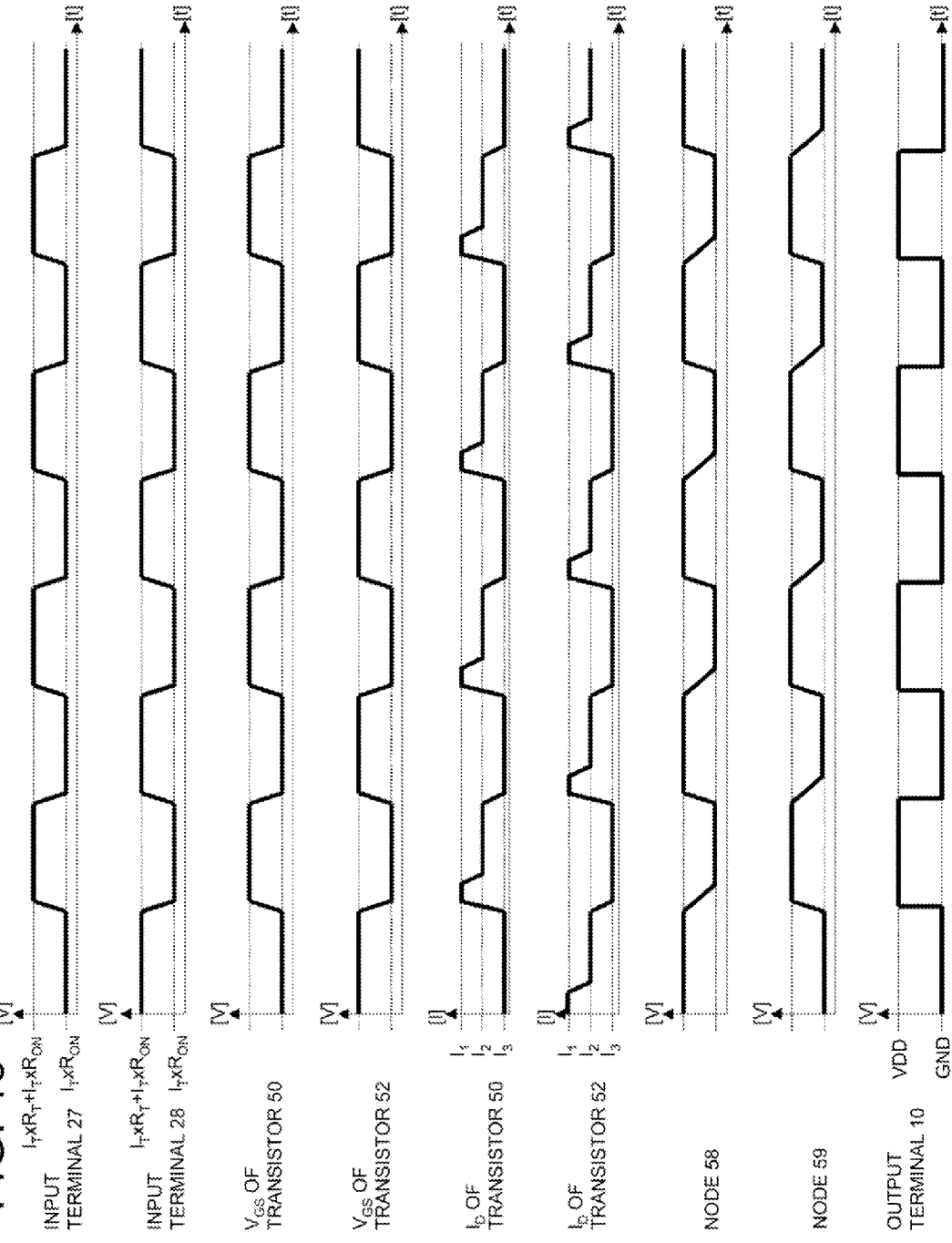
FIG. 13 is an operation chart for describing one example of operation of the sixth example of the receiver circuit of the present invention.

FIG. 13 is an operation chart (timing waveform chart) of the sixth example. FIG. 13 shows voltage waveforms of the input terminals 27 and 28 of FIG. 12, gate-to-source voltages $V_{GS}$ of the transistors 50 and 52, current waveforms of drain currents $I_D$ of the transistors 50 and 52, and voltage waveforms of the nodes 58 and 59 and the output terminal 10. Referring to FIG. 12 and FIG. 13, the operation of the sixth example will be described.

A current $I_T$ generated by the constant current source 32 is supplied to the third node 25 from the current supply terminal 29 via the input protection resistor 38. As described above, a potential difference according to a transmission data signal pattern is generated between a first node 23 and a second node 24 connected to the first termination resistor 21 and the second termination resistor 22. This potential difference is given to a node 401 and a node 402 via the input protection resistor 36 and the input protection resistor 37 from the first input terminal 27 connected to the first node 23 and the second input terminal 28 connected to the second node 24.

When the potential of the first input terminal 27 is higher than the potential of the second input terminal 28, the potential of the node 56 is raised and the potential of the node 57 is lowered.

Therefore, the gate-to-source voltage $V_{GS}$ of the second N-channel MOS transistor 50 of the first differential current detection circuit 41 increases, and the potential of the node 58 is lowered and the gate-to-source voltage $V_{GS}$ of the second N-channel MOS transistor 52 of the second differential current detection circuit 42 decreases, and the potential of the node 59 is raised.

The flip-flop circuit 43 holds a LOW level of the node 58 and a HIGH level of the node 59, and outputs a HIGH level from the output terminal 10, via the inverter 55.

On the other hand, when the potential of the first input terminal 27 is lower than the potential of the second input terminal 28, the potential of the node 56 is lowered, and the potential of the node 57 is raised.

Therefore, the gate-to-source voltage $V_{GS}$ of the second N-channel MOS transistor 50 of the first differential current detection circuit 41 decreases, and the potential of the node 58 is raised; and the gate-to-source voltage $V_{GS}$ of the second N-channel MOS transistor 52 of the second differential current detection circuit 42 increases, and the potential of the node 59 is lowered.

The flip-flop circuit 43 holds a HIGH level of the node 58 and a LOW level of the node 59, and outputs a LOW level from the output terminal 10, via the inverter 55.

As a result, it is possible to protect the differential current data detection circuit 34. Moreover, by the input protection resistor 36 and the input protection resistor 37 having appropriate resistance values, impedance matching is made possible for both a differential mode component and a common mode component.

On the other hand, when the resistance values of the input protection resistors 36 and 37 is larger by a sufficient amount relative to the resistance values of the first termination resistor 21 and the second termination resistor 22, the constant current $l_0$ output by the first N-channel MOS transistor 46 of the first differential current detection circuit 41 and the first N-channel MOS transistor 48 of the second differential current detection circuit 42, the current $I_3$ output by the second N-channel MOS transistor 50 of the first differential current detection circuit 41, and the current $I_1$ output by the second N-channel MOS transistor 52 of the second differential current detection circuit 42, can be set to be smaller by a sufficient amount related to the constant current $I_T$ output by the constant current source 32. As a result, it is possible to generate a stable potential difference in the first termination resistor 21 and the second termination resistor 22.

SEVENTH EXAMPLE

Figure 14:
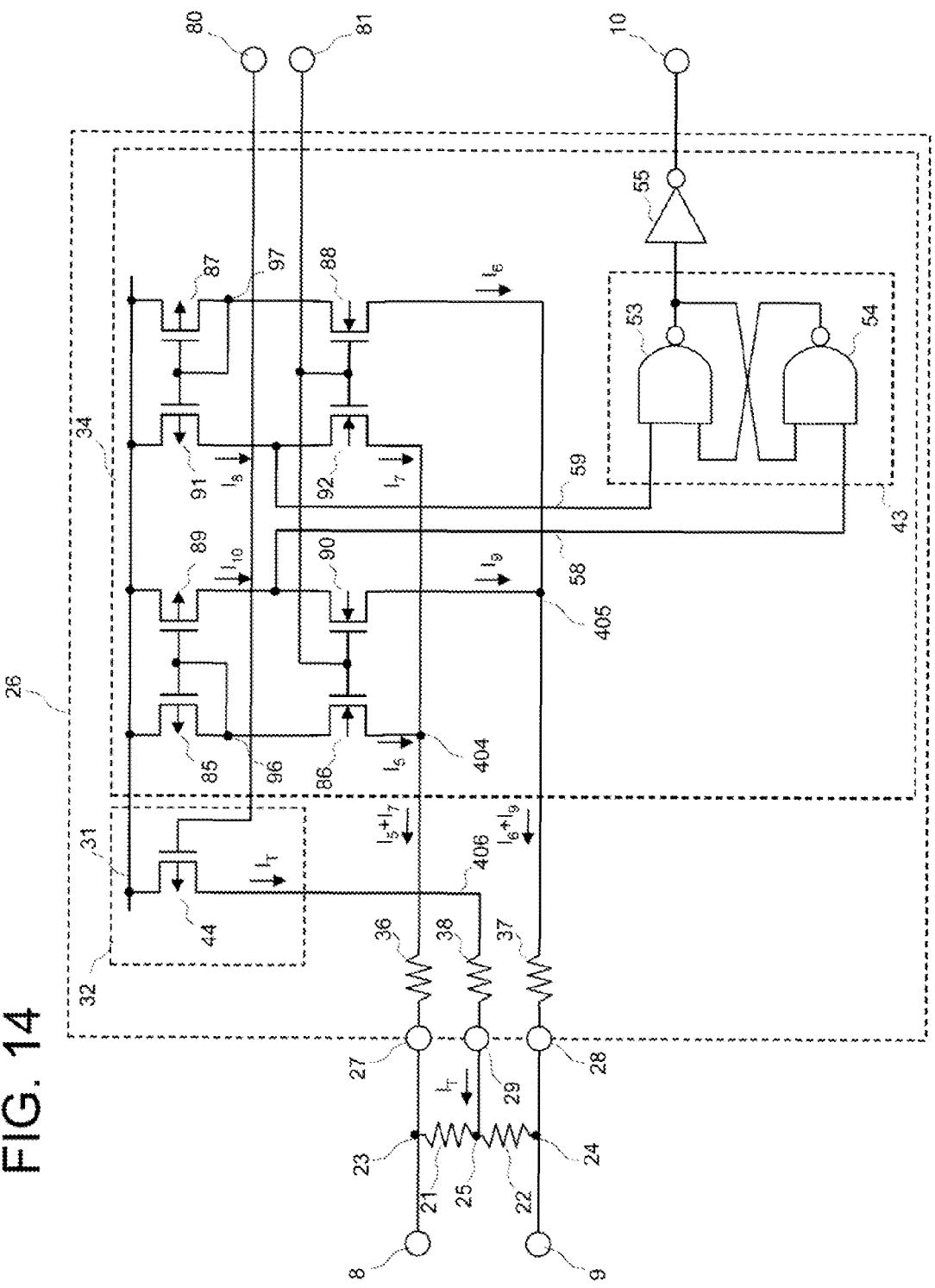
FIG. 14 is a diagram showing a configuration of a seventh example of the receiver circuit of the present invention.

FIG. 14 is a diagram showing one example of a circuit configuration of a receiver circuit 26 of the third example shown in FIG. 9. In FIG. 14, 80 designates a first bias terminal, 81 is a second bias terminal, and 43 designates a flip-flop.

An input protection resistor 36 is connected between a first input terminal 27 and a node 404. An input protection resistor 37 is connected between a second input terminal 28 and a node 405. An input protection resistor 38 is connected between a current supply terminal 29 and a node 406.

A constant current source 32 includes a P-channel MOS transistor 44 which is connected between a power supply 31 and a node 406 and has a gate connected to a first bias terminal 80, supplies a constant current $I_T$ to a first termination resistor 21 and a second termination resistor 22 via the node 406 and the input protection resistor 38.

A differential current data detection circuit 34 includes a diode-connected first P-channel MOS transistor 85, a first N-channel MOS transistor 86, a diode-connected second P-channel MOS transistor 87, a second N-channel MOS transistor 88, a third P-channel MOS transistor 89, a third N-channel MOS transistor 90, a fourth P-channel MOS transistor 91, a fourth N-channel MOS transistor 92, a flip-flop 43, and an inverter 55.

The first P-channel MOS transistor 85 is connected between the power supply line 31 and a node 96. The second P-channel MOS transistor 87 is connected between the power supply line 31 and a node 97. The third P-channel MOS transistor 89 is connected between the power supply line 31 and a node 58. The fourth P-channel MOS transistor 91 is connected between the power supply line 31 and a node 59. A gate of the third P-channel MOS transistor 89 is connected to the node 96. A gate of the fourth P-channel MOS transistor 91 is connected to the node 97.

The first N-channel MOS transistor 86 is connected between the node 96 and the node 404. The second N-channel MOS transistor 88 is connected between the node 97 and the node 405. The third N-channel MOS transistor 90 is connected between the node 58 and the node 405. The fourth N-channel MOS transistor 92 is connected between the node 59 and the node 404. A gate of the first N-channel MOS transistor 86, a gate of the second N-channel MOS transistor 88, the gate of the third N-channel MOS transistor 90, and the gate of the fourth N-channel MOS transistor 92 are connected in common to the second bias terminal 81.

The third N-channel MOS transistor 90 forms a gate-grounded circuit, and outputs a voltage signal, which is obtained by non-inverting amplification of a voltage signal of the second input terminal 28, to the node 58. The fourth N-channel MOS transistor 92 forms a gate-grounded circuit, and outputs a voltage signal, which is obtained by non-inverting amplification of a voltage signal of the first input terminal 27, to the node 59.

The first N-channel MOS transistor 86 forms a gate-grounded circuit, and outputs a voltage signal, which is obtained by non-inverting amplification of a voltage signal of the first input terminal 27. The first P-channel MOS transistor 85 and the third P-channel MOS transistor 89 form a current mirror and output a voltage signal, which is obtained by inverting amplification of a voltage signal of the node 96, to a node 58.

As a result, a voltage signal, which is obtained by inverting amplification of the voltage signal of the first input terminal 27, is output to the node 58, by the first N-channel MOS transistor 86, the first P-channel MOS transistor 85, and the third P-channel MOS transistor 89.

In the same way, the second N-channel MOS transistor 88 forms a gate-grounded circuit, and outputs a voltage signal, which is obtained by non-inverting amplification of a voltage signal of the second input terminal 28, to the node 97. The second P-channel MOS transistor 87 and the fourth P-channel MOS transistor 91 form a current mirror and output a voltage signal, which is obtained by inverting amplification of a voltage signal of the node 97, to the node 59. As a result, a voltage signal, which is obtained by inverting amplification of the voltage signal of the second input terminal 28 is output to the node 59, by the second N-channel MOS transistor 88, the second P-channel MOS transistor 87, and the fourth P-channel MOS transistor 91.

A flip-flop circuit 43, which is an RS latch including a NAND 53 and a NAND 54, holds potential of the node 58 and potential of the node 59, and outputs values thereof that are held, from an output terminal 10, via the inverter 55.

Figure 15:
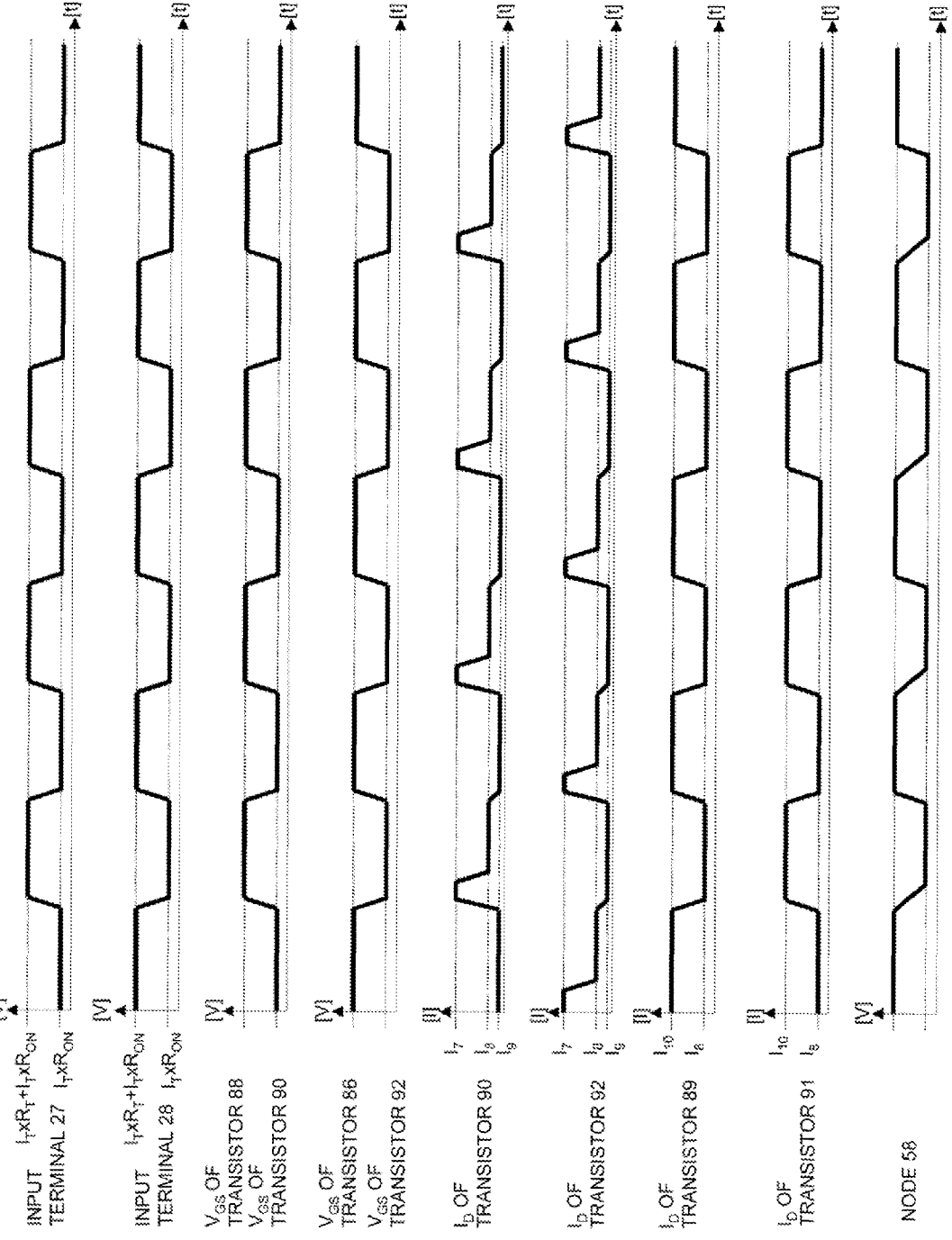
FIG. 15 is an operation chart for describing one example of operation of the seventh example of the receiver circuit of the present invention.

FIG. 15 is an operation chart (timing waveform chart) of the seventh example. FIG. 15 shows voltage waveforms of the input terminals 27 and 28, gate-to-source voltages $V_{GS}$ of the transistors 88 and 90, gate-to-source voltages $V_{GS}$ of the transistors 86 and 92, current waveforms of drain currents $I_D$ of the transistors 90, 92, 89, and 91, and voltage waveform of the node 58, of FIG. 14. Referring to FIG. 14 and FIG. 15, the circuit operation of the seventh example will be described.

A current $I_T$ generated by the constant current source 32 is supplied to a third node 25 from the current supply terminal 29 via the input protection resistor 38.

As described above, a potential difference is generated according to a transmission data signal pattern, between a first node 23 and a second node 24 connected respectively to the first termination resistor 21 and the second termination resistor 22, and this potential difference is applied to the node 404 and the node 405 via the input protection resistor 36 and the input protection resistor 37 from the first input terminal 27 connected to the first node 23 and the second input terminal 28 connected to the second node 24.

When a potential of the first input terminal 27 is higher than a potential of the second input terminal 28, since the potential of the first input terminal 27 undergoes inverting amplification, by the first N-channel MOS transistor 86, the first P-channel MOS transistor 85, and the third P-channel MOS transistor 89, the potential of the node 58 is lowered. Since the potential of the second input terminal 28 undergoes non-inverting amplification, by the third N-channel MOS transistor 90, the potential of the node 58 is lowered.

Since the potential of the second input terminal 28 undergoes inverting amplification by the second N-channel MOS transistor 88, the second P-channel MOS transistor 87, and the fourth P-channel MOS transistor 91, the potential of the node 59 is raised.

Since the potential of the first input terminal 27 undergoes non-inverting amplification, by the fourth N-channel MOS transistor 92, the potential of the node 59 is raised.

The flip-flop circuit 43 holds a LOW level of the node 58 and a HIGH level of the node 59, and outputs a HIGH level from the output terminal 10, via the inverter 55.

On the other hand, when the potential of the first input terminal 27 is lower than the potential of the second input terminal 28, since the potential of the first input terminal 27 undergoes inverting amplification, by the first N-channel MOS transistor 86, the first P-channel MOS transistor 85, and the third P-channel MOS transistor 89, the potential of the node 58 is raised. Since the potential of the second input terminal 28 undergoes non-inverting amplification, by the third N-channel MOS transistor 90, the potential of the node 58 is raised. Since the potential of the second input terminal 28 undergoes inverting amplification by the second N-channel MOS transistor 88, the second P-channel MOS transistor 87, and the fourth P-channel MOS transistor 91, the potential of the node 59 is lowered. Since the potential of the first input terminal 27 undergoes non-inverting amplification, by the fourth N-channel MOS transistor 92, the potential of the node 59 is lowered.

The flip-flop circuit 43 holds a HIGH level of the node 58 and a LOW level of the node 59, and outputs a LOW level from the output terminal 10, via the inverter 55.

As a result, it is possible to protect the differential current data detection circuit 34. With the input protection resistor 36 and the input protection resistor 37 having appropriate resistance values, impedance matching is made possible for both a differential mode component and a common mode component.

By setting the output current of the first N-channel MOS transistor 86, the second N-channel MOS transistor 88, the third N-channel MOS transistor 90, and the fourth N-channel MOS transistor 92 forming the differential current data detection circuit 34, to be sufficiently small relative to the constant current $I_T$ output by the constant current source 32, it is possible to stably generate a potential difference at the first termination resistor 21 and the second termination resistor 22.

EIGHTH EXAMPLE

Figure 16:
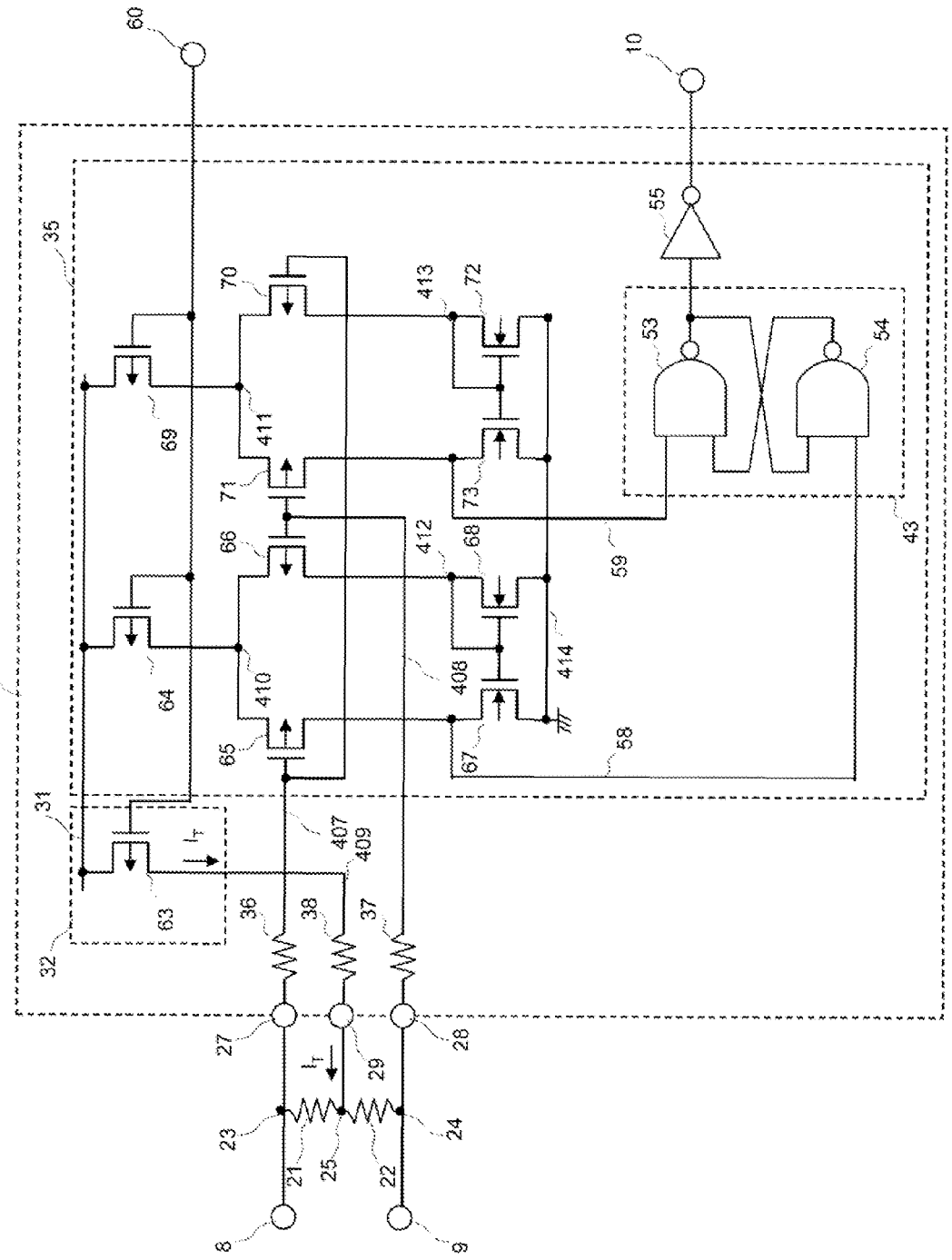
FIG. 16 is a diagram showing a configuration of an eighth example of the receiver circuit of the present invention.

FIG. 16 is a diagram showing one example of a circuit configuration of a receiver circuit 26 of the fourth example shown in FIG. 10. In FIG. 16, 60 designates a bias terminal and 43 designates a flip-flop.

An input protection resistor 36 is connected between a first input terminal 27 and a node 407. An input protection resistor 37 is connected between a second input terminal 28 and a node 408. An input protection resistor 38 is connected between a current supply terminal 29 and a node 409.

A constant current source 32 includes a P-channel MOS transistor 63; which is connected between a power supply 31 and a node 409 and has a gate is connected to the bias terminal 60. The constant current source 32 supplies a constant current $I_T$ to a first termination resistor 21 and a second termination resistor 22 via the node 409 and the input protection resistor 38.

A differential voltage data detection circuit 35 includes a first constant current source transistor 64, a first P-channel MOS transistor 65, a second P-channel MOS transistor 66, a first N-channel MOS transistor 67, a diode-connected second N-channel MOS transistor 68, a second constant current source transistor 69, a third P-channel MOS transistor 70, a fourth P-channel MOS transistor 71, a diode-connected third N-channel MOS transistor 72, a fourth N-channel MOS transistor 73, a flip-flop 43, and an inverter 55.

The first constant current source transistor 64 is connected between the power supply line 31 and a node 410. The first P-channel MOS transistor 65 is connected between the node 410 and a node 58. The second P-channel MOS transistor 66 is connected between the node 410 and a node 412. The first N-channel MOS transistor 67 is connected between the node 58 and a ground line GND 414. The second N-channel MOS transistor 68 is connected between the node 412 and the ground line GND 414. The second constant current source transistor 69 is connected between the power supply line 31 and a node 411. The third P-channel MOS transistor 70 is connected between the node 411 and a node 413. The fourth P-channel MOS transistor 71 is connected between the node 411 and a node 59. The third N-channel MOS transistor 72 is connected between the node 413 and the ground line GND 414. The fourth N-channel MOS transistor 73 is connected between the node 59 and the ground line GND 414. A gate of the first constant current source transistor 64 and a gate of the second constant current source transistor 69 are connected to the bias terminal 60. A gate of the first P-channel MOS transistor 65 and a gate of the third P-channel MOS transistor 70 are connected to the node 407. A gate of the second P-channel MOS transistor 66 and a gate of the fourth P-channel MOS transistor 71 are connected to the node 408.

A differential amplifier is formed by the first constant current source transistor 64, the first P-channel MOS transistor 65, the second P-channel MOS transistor 66, the first N-channel MOS transistor 67, the diode connected second N-channel MOS transistor 68, the second constant current source transistor 69, the third P-channel MOS transistor 70, the fourth P-channel MOS transistor 71, the diode-connected third N-channel MOS transistor 72, and the fourth N-channel MOS transistor 73. A voltage signal, which is obtained by inverting amplification of a voltage signal of the first input terminal 27, is supplied to the node 58, and a voltage signal, which is obtained by inverting amplification of a voltage signal of the second input terminal 28, is supplied to the node 59.

The flip-flop circuit 43, which is an RS latch including a NAND 53 and a NAND 54, holds a potential of the node 58 and a potential of the node 59, and outputs values thereof that are held, from an output terminal 10, via the inverter 55.

Figure 17:
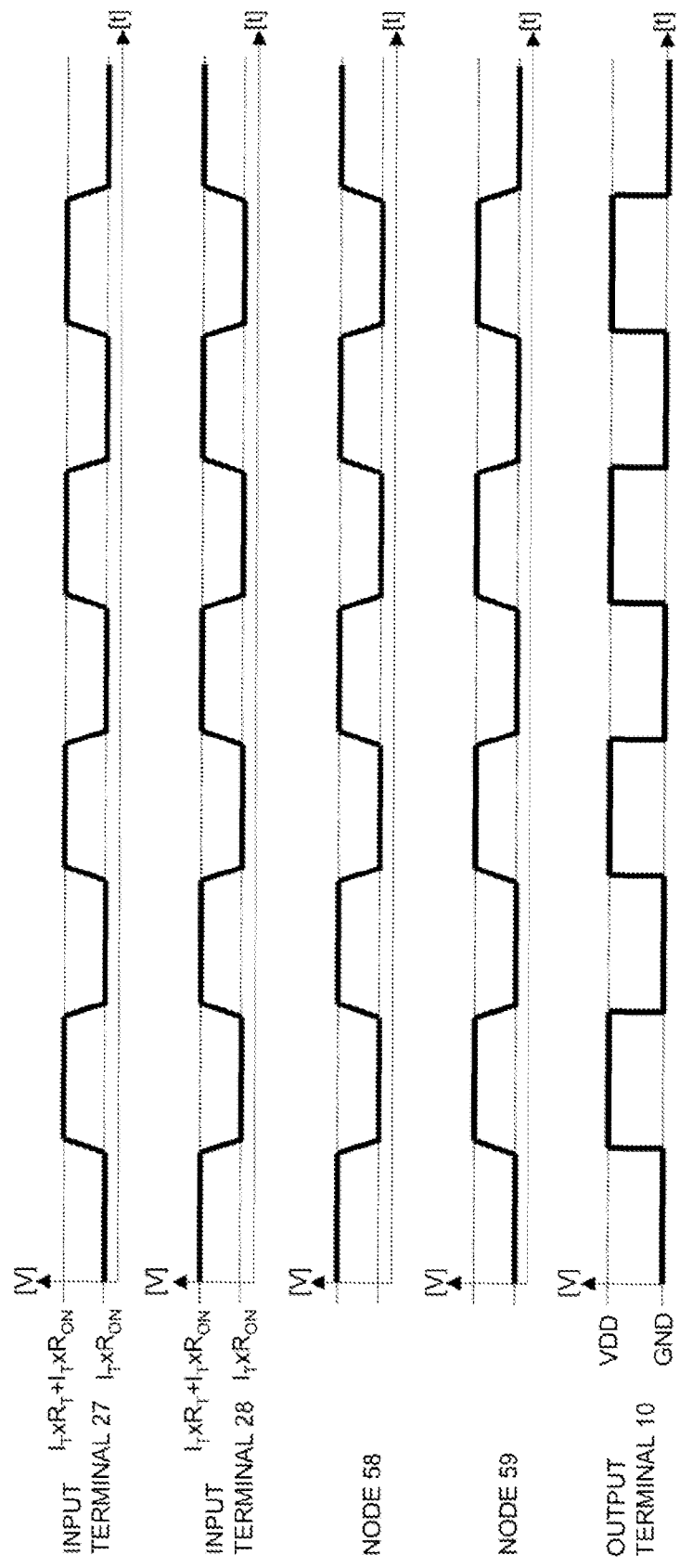
FIG. 17 is an operation chart for describing one example of operation of the eighth example of the receiver circuit of the present invention.
Figure 18:
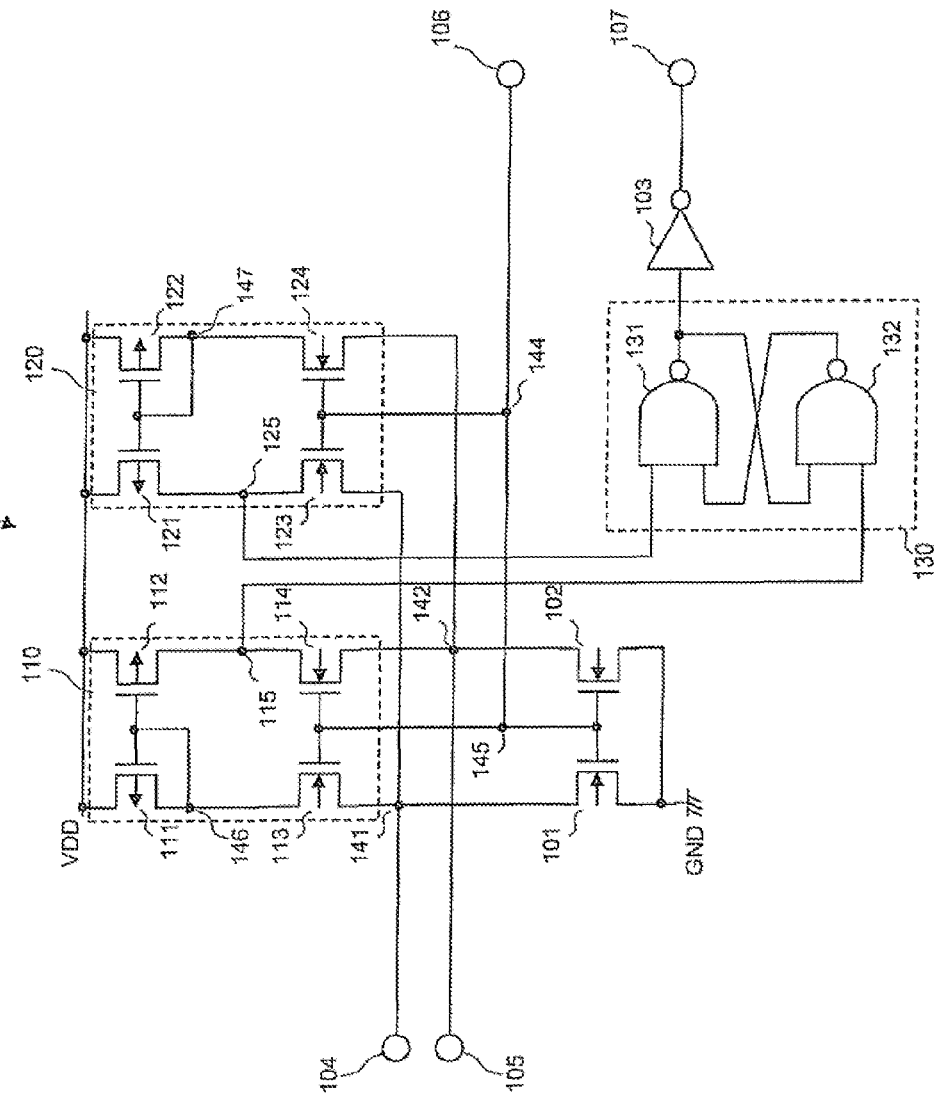
FIG. 18 is a diagram showing a configuration of a receiver circuit of related technology 1 (Patent Document 1).
Figure 19:
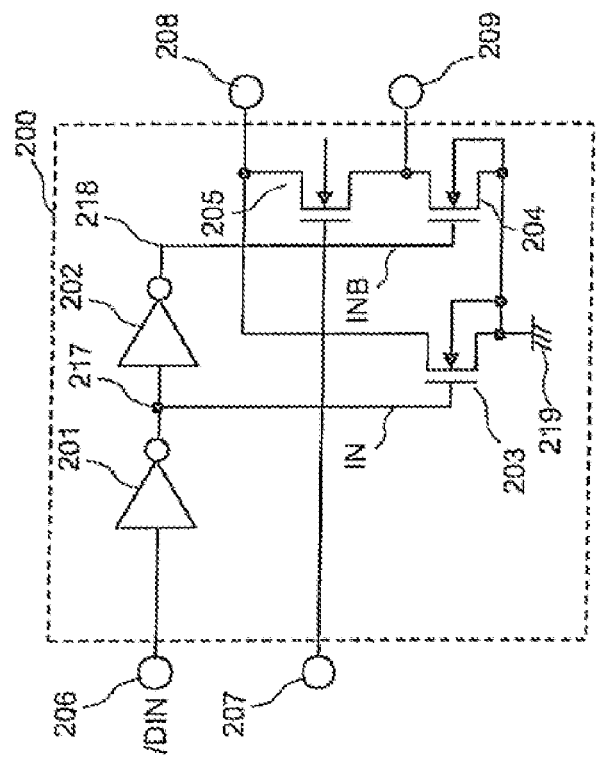
FIG. 19 is a diagram showing a configuration of a transmitter circuit of related technology 1 (Patent Document 1).
Figure 20:
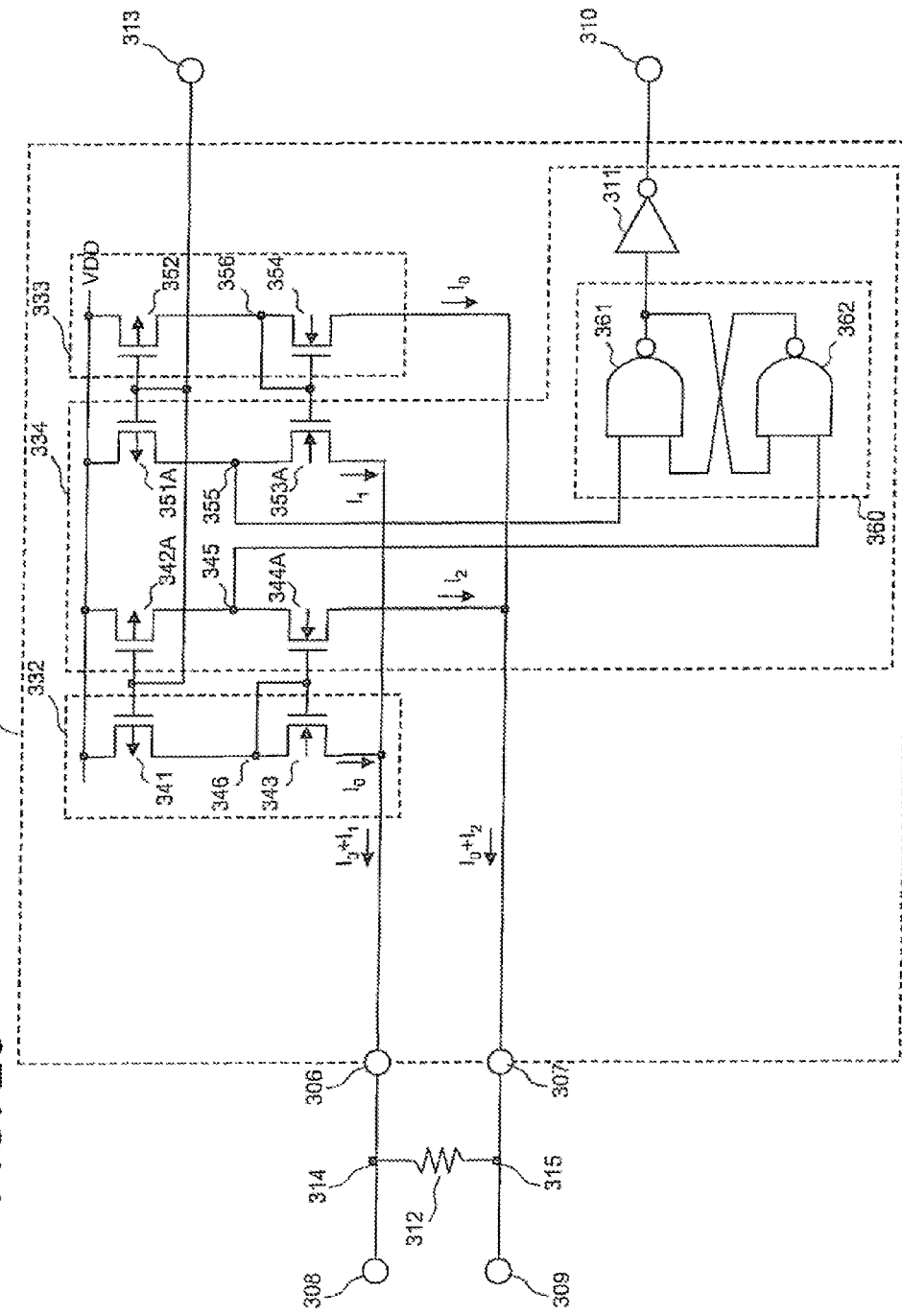
FIG. 20 is a diagram showing a configuration of a receiver circuit of related technology 2 (Patent Document 2).
Figure 21:
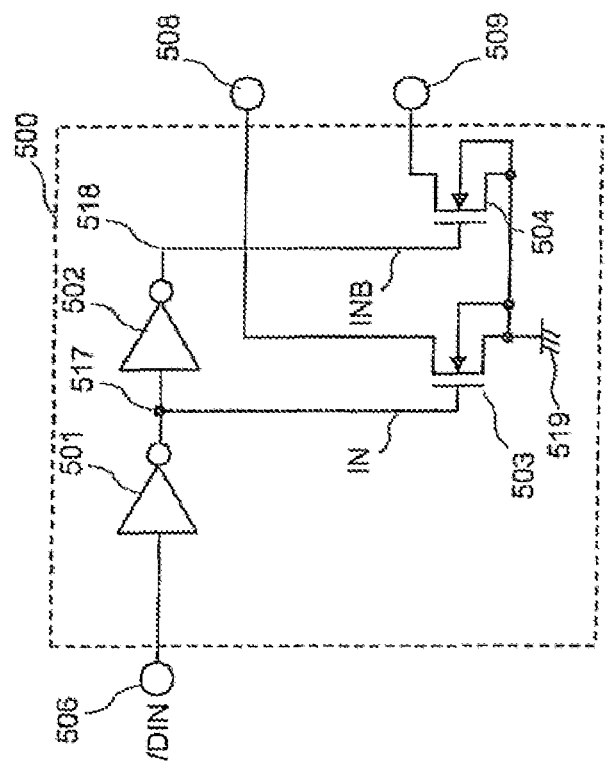
FIG. 21 is a diagram showing a configuration of a transmitter circuit of related technology 2 (Patent Document 2).

FIG. 17 is an operation chart (timing waveform chart) of the eighth example. FIG. 17 shows voltage waveforms of the input terminals 27 and 28, the nodes 58 and 59, and the output terminal 10 of FIG. 16. Referring to FIG. 16 and FIG. 17, the operation of the eighth example will be described.

A current $I_T$ generated by the constant current source 32 is supplied to a third node 25 from the current supply terminal 29 via the input protection resistor 38.

As described above, a potential difference is generated according to a transmission data signal pattern, between a first node 23 and a second node 24 connected to the first termination resistor 21 and the second termination resistor 22, and this potential difference is applied to the node 407 and the node 408 via the input protection resistor 36 and the input protection resistor 37 from the first input terminal 27 connected to the first node 23 and the second input terminal 28 connected to the second node 24.

When a potential of the first input terminal 27 is higher than a potential of the second input terminal 28, since the potential of the first input terminal 27 undergoes inverting amplification, by the first constant current source transistor 64, the first P-channel MOS transistor 65, the second P-channel MOS transistor 66, the first N-channel MOS transistor 67, and the diode-connected second N-channel MOS transistor 68, the potential of the node 58 is lowered.

Since the potential of the second input terminal 28 undergoes inverting amplification, by the second constant current source transistor 69, the third P-channel MOS transistor 70, the fourth P-channel MOS transistor 71 the diode-connected third N-channel MOS transistor 72, and the fourth N-channel MOS transistor 73, the potential of the node 59 is raised.

The flip-flop circuit 43 holds a LOW level of the node 58 and a HIGH level of the node 59, and outputs a HIGH level from the output terminal 10, via the inverter 55.

On the other hand, when the potential of the first input terminal 27 is lower than the potential of the second input terminal 28, since the potential of the first input terminal 27 undergoes inverting amplification, by the first constant current source transistor 64, the first P-channel MOS transistor 65, the second P-channel MOS transistor 66, the first N-channel MOS transistor 67, and the diode-connected second N-channel MOS transistor 68, the potential of the node 58 is raised.

Since the potential of the second input terminal 28 undergoes inverting amplification, by the second constant current source transistor 69, the third P-channel MOS transistor 70, the fourth P-channel MOS transistor 71, the diode-connected third N-channel MOS transistor 72, and the fourth N-channel MOS transistor 73, the potential of the node 59 is lowered.

The flip-flop circuit 43 holds a HIGH level of the node 58 and a LOW level of the node 59, and outputs a LOW level from the output terminal 10, via the inverter 55.

As a result, it is possible to protect the differential voltage data detection circuit 35.

Furthermore, it is possible to generate a stable potential difference in the first termination resistor 21 and the second termination resistor 22.

A receiver circuit 426 shown in the second exemplary embodiment of the present invention implements the receiver circuit 26 of the first exemplary embodiment of the present invention, and can provide functions and effects similar to the receiver circuit of the first to the eighth examples.

INDUSTRIAL APPLICABILITY

Electronic apparatuses such as mobile telephones, notebook computers, and the like, may be cited as application examples of the present invention.

The disclosures of the aforementioned Patent Documents are incorporated by reference herein. The particular exemplary embodiments or examples may be modified or adjusted within the gamut of the entire disclosure of the present invention, inclusive of claims, based on the fundamental technical concept of the invention. Further, variegated combinations or selections of the elements disclosed herein may be made within the framework of the claims. That is, the present invention may encompass various modifications or corrections that may occur to those skilled in the art within the gamut of the entire disclosure of the present invention, inclusive of claim and the technical concept of the present invention.

The invention claimed is:

1. A data transmission system comprising:
a transmission line including a first transmission line and a second transmission line;
a transmitter connected to one end of the transmission line;
a receiver connected to another end of the transmission line;
a first input protection resistor connected between the first node and the data detection unit;
a second input protection resistor connected between the second node and the data detection unit; and
a third input protection resistor connected between the third node and the current supply unit, wherein
the transmitter comprises:
a first connection unit connected to one end of the first transmission line, the first connection unit being controlled to be turned ON and OFF in accordance with data for transmission, the first connection unit, when turned ON, electrically connecting the first transmission line to a ground terminal; and
a second connection unit connected to one end of the second transmission line, the second connection unit being controlled to be turned ON and OFF complementarily with the first connection unit in accordance with the data for transmission, the second connection unit, when turned ON, electrically connecting the second transmission line to a ground terminal, and wherein
the receiver comprises:
a first termination resistor having one end connected to a first node that is connected to another end of the first transmission line;
a second termination resistor having one end connected to a second node that is connected to another end of the second transmission line;
the first and second termination resistors having another ends connected in common to a third node; and
a receiver circuit comprising:
a current supply unit that supplies a current to the third node; and
a data detection unit that generates and outputs received data corresponding to the data for transmission, in accordance with a potential difference between the first node and the second node.

2. The data transmission system according to claim 1, wherein a resistance value of the first termination resistor and a resistance value of the second termination resistor match half a differential mode impedance of the transmission line.

3. The data transmission system according to claim 1, wherein the first connection unit includes
a first MOS transistor having a drain connected to one end of the first transmission line, and a source connected to the ground terminal, an ON resistance of the first MOS transistor matching a characteristic impedance of the transmission line, and wherein
the second connection unit includes
a second MOS transistor having a drain connected to the second transmission line, and a source connected to the ground terminal, an ON resistance of the second MOS transistor matching a characteristic impedance of the transmission line, signals assuming complementary values based on the data for transmission being supplied respectively to a gate of the second MOS transistor and a gate of the first MOS transistor.

4. The data transmission system according to claim 1, wherein the first connection unit, when turned ON, electrically connects the first transmission line to a power supply terminal, instead of the ground terminal, the second connection unit, when turned ON, electrically connects the second transmission line to a power supply terminal, instead of the ground terminal, and the current supply unit supplies a sink current to the third node.

5. The data transmission system according to claim 4, wherein the first connection unit includes a first MOS transistor having a drain connected to one end of the first transmission line, and a source connected to the power supply terminal, an ON resistance of the first MOS transistor matching a characteristic impedance of the transmission line, and wherein the second connection unit includes a second MOS transistor having a drain connected to one end of the second transmission line, and a source connected to the power supply terminal, an ON resistance of the second MOS transistor matching a characteristic impedance of the transmission line, signals assuming complementary values based on the data for transmission being supplied respectively to a gate of the second MOS transistor and a gate of the first MOS transistor.

6. The data transmission system according to claim 1, wherein a resistance value of the first input protection resistor and a resistance value of the second input protection resistor match double a common mode impedance of the transmission line.

7. The data transmission system according to claim 1, comprising:

a first input protection resistor connected between the first node and the data detection unit;

a second input protection resistor connected between the second node and the data detection unit;

a third input protection resistor connected between the third node and the current supply unit; and a capacitor connected between the current supply unit and a ground terminal.

8. The data transmission system according to claim 7, wherein a resistance value of the third input protection resistor matches the difference between the common mode impedance of the transmission line and $\frac{1}{4}$ of the differential mode impedance of the transmission line.

9. The data transmission system according to claim 1, wherein the data detection unit includes a differential current data detection circuit that generates the received data in response to a current difference between a current flowing through the first node and a current flowing through the second node.

10. The data transmission system according to claim 9, wherein the differential current data detection circuit includes:

a first detection circuit that generates a first detection signal in response to a current difference between a current flowing at the first node and a current flowing at the second node;

a second detection circuit that generates a second detection signal in response to a current difference between a current flowing at the second node and a current flowing at the first node; and a flip-flop circuit that receives the first detection signal and the second detection signal and generates and holds the received data.

11. The data transmission system according to claim 1, wherein the data detection unit includes:

a first constant voltage circuit connected to the first input protection resistor; and a second constant voltage circuit connected to the second input protection resistor; and a differential current data detection circuit that generates the received data in response to a current difference between a current flowing at the first node and a current flowing at the second node.

12. The data transmission system according to claim 1, wherein the data detection unit comprises a differential voltage data detection circuit including differential pair transistors having an input pair connected to other ends of the first and second input protection resistors, the other ends of the first and second input protection resistors being opposite respectively to one ends of the first and second input protection resistor, the one ends of the first and second input protection resistor being connected respectively to the first node and the second node, the differential voltage data detection circuit generating the received data in response to a current difference between current flowing at the first node and current flowing at the second node.

13. An electronic apparatus comprising the data transmission system according to claim 1.

* * * * *